(12) United States Patent
Sakoda

(10) Patent No.: US 9,265,044 B2
(45) Date of Patent: *Feb. 16, 2016

(54) WIRELESS COMMUNICATION SYSTEM, WIRELESS COMMUNICATION APPARATUS AND WIRELESS COMMUNICATION METHOD AND COMPUTER PROGRAM

(71) Applicant: Sony Corporation, Tokyo (JP)

(72) Inventor: Kazuyuki Sakoda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/460,088

(22) Filed: Aug. 14, 2014

(65) Prior Publication Data

US 2014/0355577 A1 Dec. 4, 2014

Related U.S. Application Data

(60) Continuation of application No. 14/051,177, filed on Oct. 10, 2013, now Pat. No. 8,830,986, which is a continuation of application No. 12/326,929, filed on Dec. 3, 2008, now Pat. No. 8,625,571, which is a division of application No. 10/500,591, filed as application No. PCT/JP2004/001065 on Feb. 3, 2004, now Pat. No. 7,787,437.

(30) Foreign Application Priority Data

Feb. 3, 2003 (JP) .................................. 2003-026457

(51) Int. Cl.
*H04W 4/00* (2009.01)
*H04W 72/04* (2009.01)
(Continued)

(52) U.S. Cl.
CPC .......... *H04W 72/0446* (2013.01); *H04L 5/0058* (2013.01); *H04W 48/08* (2013.01); *H04W 52/0216* (2013.01); *H04W 56/002* (2013.01); *H04W 84/12* (2013.01); *H04W 84/18* (2013.01)

(58) Field of Classification Search
USPC .......... 370/350, 311, 348; 455/41.2, 522, 574
See application file for complete search history.

(56) References Cited

U.S. PATENT DOCUMENTS 5,319,641 A 6/1994 Fridrich et al.
5,881,055 A 3/1999 Kondo
(Continued)

FOREIGN PATENT DOCUMENTS

EP 0 828 355 3/1998
EP 1 139 606 10/2001
(Continued)

OTHER PUBLICATIONS

European Office Action issued on Mar. 12, 2012 in corresponding European Patent Application No. 04 707 619.
(Continued)

*Primary Examiner* — Zewdu A Beyen
(74) *Attorney, Agent, or Firm* — Oblon, McClelland, Maier & Neustadt, L.L.P.

(57) ABSTRACT

In order to solve problems arising when a communication system such as a wireless LAN is constructed as a decentralized distributed type network without a relationship of control station and controlled stations such as a master station and slave stations, in a wireless communication system composed of a plurality of communication stations without a relationship of control station and controlled stations, respective communication stations transmit beacons with information concerning a network written thereon with each other to construct the network, and it becomes possible to make sophisticated judgment such as communication states of other communication stations by those beacons.

20 Claims, 28 Drawing Sheets

(51) Int. Cl.
*H04W 48/08* (2009.01)
*H04W 56/00* (2009.01)
*H04L 5/00* (2006.01)
*H04W 52/02* (2009.01)
*H04W 84/12* (2009.01)
*H04W 84/18* (2009.01)

(56) References Cited

U.S. PATENT DOCUMENTS

| | | | |
|---|---|---|---|
| 5,940,399 | A | 8/1999 | Weizman |
| 6,018,642 | A | 1/2000 | Adachi |
| 6,028,853 | A | 2/2000 | Haartsen |
| 6,157,622 | A | 12/2000 | Tanaka et al. |
| 6,178,506 | B1 | 1/2001 | Quick, Jr. |
| 6,236,674 | B1 | 5/2001 | Morelli et al. |
| 6,512,935 | B1 | 1/2003 | Redi |
| 6,791,996 | B1 | 9/2004 | Watanabe et al. |
| 6,934,752 | B1 | 8/2005 | Gubbi |
| 6,978,149 | B1 | 12/2005 | Morelli et al. |
| 6,985,542 | B1 * | 1/2006 | Nir et al. ............ 375/343 |
| 7,039,358 | B1 | 5/2006 | Shellhammer et al. |
| 7,302,227 | B2 | 11/2007 | Sakoda |
| 7,844,223 | B2 | 11/2010 | Sakoda |
| 8,099,049 | B2 | 1/2012 | Sakoda |
| 8,391,257 | B2 | 3/2013 | Sakoda |
| 8,761,072 | B2 | 6/2014 | Sakoda |
| 8,837,448 | B2 | 9/2014 | Sakoda |
| 2002/0044533 | A1 | 4/2002 | Bahl et al. |
| 2002/0045428 | A1 | 4/2002 | Chesson |
| 2002/0105970 | A1 | 8/2002 | Shvodian |
| 2003/0016732 | A1 | 1/2003 | Miklos et al. |
| 2003/0053437 | A1 | 3/2003 | Bahl et al. |
| 2003/0117968 | A1 | 6/2003 | Motegi et al. |
| 2003/0147368 | A1 | 8/2003 | Eitan et al. |
| 2003/0152059 | A1 | 8/2003 | Odman |
| 2003/0174690 | A1 | 9/2003 | Benveniste |
| 2003/0185170 | A1 | 10/2003 | Allen et al. |
| 2003/0224775 | A1 | 12/2003 | Suda et al. |
| 2004/0008661 | A1 | 1/2004 | Myles et al. |
| 2004/0013127 | A1 | 1/2004 | Shvodian |
| 2004/0022219 | A1 * | 2/2004 | Mangold et al. ............ 370/336 |
| 2004/0042501 | A1 | 3/2004 | Hester et al. |
| 2004/0047314 | A1 | 3/2004 | Li |
| 2004/0151193 | A1 | 8/2004 | Rune et al. |
| 2004/0152416 | A1 | 8/2004 | Dahl |
| 2005/0054294 | A1 | 3/2005 | Khun-Jush et al. |
| 2006/0165024 | A1 | 7/2006 | Iwami |
| 2012/0170562 | A1 | 7/2012 | Sakoda |

FOREIGN PATENT DOCUMENTS

| | | |
|---|---|---|
| EP | 1 206 070 | 5/2002 |
| GB | 2 375 014 A | 10/2002 |
| JP | 7-336370 | 12/1995 |
| JP | 09-135254 | 5/1997 |
| JP | 9-139747 | 5/1997 |
| JP | 11-251992 | 9/1999 |
| JP | 11-275106 | 10/1999 |
| JP | 2000-165930 | 6/2000 |
| JP | 2000-512098 | 9/2000 |
| JP | 2001-268083 | 9/2001 |
| JP | 2002-300175 | 10/2002 |
| JP | 2003-229869 | 8/2003 |
| JP | 2003-249936 | 9/2003 |
| WO | 97/47096 | 12/1997 |

OTHER PUBLICATIONS

Korean Office Action issued Jun. 30, 2011, in Patent Application No. 10-2004-7015005 (with English-language translation).
Japanese Office Action issued May 15, 2012 in patent application No. 2010-105001.
Supplementary European Search Report issued on Mar. 25, 2011 in corresponding European Application No. 04 707 619.
U.S. Appl. No. 14/482,708, filed Sep. 10, 2014, Sakoda.
European Search Report issued Mar. 18, 2015 in corresponding European Patent Application No. 14194159.1.

* cited by examiner

000 : TBTT
001 : TBTT+20
010 : TBTT+40
011 : TBTT+60
100 : TBTT+80
101 : TBTT+100
110 : TBTT+120
111 : TBTT+X

WIRELESS COMMUNICATION SYSTEM, WIRELESS COMMUNICATION APPARATUS AND WIRELESS COMMUNICATION METHOD AND COMPUTER PROGRAM

CROSS REFERENCE TO RELATED APPLICATIONS

This is a continuation of U.S. Ser. No. 14/051,177 filed Oct. 10, 2013, which is based upon and claims the benefit of priority under 35 U.S.C. §120 for U.S. Ser. No. 12/326,929, filed Dec. 3, 2008, the entire contents of each which is incorporated herein by reference. U.S. Ser. No. 12/326,929 is a Divisional of U.S. Ser. No. 10/500,591, filed Nov. 18, 2004, now U.S. Pat. No. 7,787,437, which is a National Stage of PCT/JP04/01065, filed Feb. 3, 2004, and claims the benefit of priority under 35 U.S.C. §119 from Japanese Patent Application No. 2003-026457, filed Feb. 3, 2003.

TECHNICAL FIELD

The present invention relates to a wireless communication system, a wireless communication apparatus and a wireless communication method and a computer program suitable for use in configuring a wireless LAN (Local Area Network: local area network) for making data communication, for example, to construct a decentralized distributed type network without a relationship of control station and controlled station, such as a master station and slave stations.

More specifically, the present invention relates to a wireless communication system, a wireless communication apparatus and a wireless communication method and a computer program for forming a decentralized distributed type wireless network formed when respective communication stations transmit their beacons with network information and the like written therein with each other at every predetermined frame period, and particularly relates to a wireless communication system, a wireless communication apparatus and a wireless communication method and a computer program for forming a decentralized distributed type wireless network while avoiding collision of beacons transmitted from the respective communication stations.

BACKGROUND ART

As media access control for wireless LAN system, access control standardized by IEEE (The Institute of Electrical and Electronics Engineers) 802.11 systems have been widely known so far. International Standard ISO/IEC 8802-11: 1999 (E) ANSI/IEEE Std 802.11, 1999 Edition, Part II: Wireless LAN Medium Access Control (MAC) and Physical Layer (PHY) specifications or the like has described the details of the IEEE802.11.

Networking in the IEEE802.11 is based on a concept of a BSS (Basic Service Set). Two kinds of BSS are available, that is, BBS defined by the infrastructure mode in which a master control station such as an access point (Access Point: AP) exists and IBSS (Independent BSS) defined by the ad hoc mode composed of only a plurality of mobile terminals (Mobile Terminal: MT).

Operations of the IEEE802.11 in the infrastructure mode will be described with reference to FIG. 30. In the BSS in the infrastructure mode, an access point for performing coordination should be absolutely provided within a wireless communication system. In FIG. 30, assuming that a communication station SAT0, for example, is a communication station SA which functions as an access point, then BSSes within a range of radio waves near the local station are collected to construct a cell in the so-called cellular system. Mobile stations (SAT1, SAT2) existing neat the access point are accommodated into the access point and joined the network as a member of the BSS. The access point transmits a control signal called a beacon at a proper time space. A mobile terminal that can receive this beacon recognizes that the access points exists near it and establishes connection between it and the access point.

The communication station SAT0, which is the access point, transmits a beacon (Beacon) at a predetermined period space as shown on the right-hand side of FIG. 30. The next beacon transmission time is sent into the beacon by a parameter called a target beacon transmit time (TBTT: Target Beacon Transmit Time). When a time reaches the TBTT field, the access point activates a beacon transmission procedure. Also, since a neighboring mobile terminal receives a beacon and is able to recognize the next beacon transmission time by decoding the inside TBTT field, depending on the cases (mobile terminal need not receive information), the receiver may be de-energized until the next TBTT field or a plurality of future target beacon transmission times and the mobile terminal may be placed in the sleep mode.

This specification principally considers the gist of the present invention in which the network is operated without application of a master control station such as the access point, and hence the infrastructure mode will not be described any more.

Next, communication operations according to the IEEE802.11 in the ad hoc mode will be described with reference to FIGS. 31 and 32.

On the other hand, in the IBSS in the ad hoc mode, after each communication station (mobile terminal) has negotiated with a plurality of communication stations, each communication station defines the IBSS independently. When the IBSS is defined, the communication station group determines the TBTT at every constant interval after negotiations. When each communication station recognizes the TBTT with reference to a clock within the local station, if it recognizes that other communication station has not transmitted the beacon after a delay of a random time, then the communication station transmits the beacon. FIG. 31 shows an example of the case in which two communication stations SAT1, SAT2 constitute the IBSS. Accordingly, in this case, any one of communication stations belonging to the IBSS is able to transmit the beacon at each arrival of the TBTT field. Also, it is frequently observed that the beacons will conflict with each other.

Further, also in the IBSS, according to the necessity, each communication station is placed in the sleep mode in which a power switch of its transmission and reception unit is turned off. A signal transmission and reception procedure in this case will be described with reference to FIG. 32.

In the IEEE82.11, when the sleep mode is applied to the IBSS, a certain time period from the TBTT is defined as an ATIM (Announcement Traffic Indication Message) Window (hereinafter referred to as an "ATIM window").

During the time period of the ATIM window, since all communication stations belonging to the IBSS are operating the reception units, even the communication station which is being operated in the sleep mode fundamentally is able to receive communication in this time period. When each communication station has its own information for other communication station, after a beacon has been transmitted in the time period of this ATIM window, the communication station lets the reception side know that the communication station has its own information for other communication station by transmitting the ATIM packet to other communication station. The communication station, which has received the ATIM packet, causes the reception unit to continue operating until the reception from the station that has transmitted the ATIM packet is ended.

FIG. 32 shows the case in which three communication stations STA1, STA2, STA3 exist within the IBSS, by way of example. As shown in FIG. 32, at the time TBTT, the respective communication stations STA1, STA2, STA3 operate back-off timers while monitoring the media state over a random time. The example of FIG. 32 shows the case in which the communication station STA1 transmits the beacon after the timer of the communication station STA1 has ended counting in the earliest stage. Since the communication station STA1 transmits the beacon, other two communication stations STA2 and STA3 do not transmit the beacon.

The example of FIG. 32 shows the case in which the communication station STA1 holds information for the communication station STA2, the communication station STA2 holding information for the communication station STA3. At that time, as shown in FIGS. 32B, 32C, after having transmitted/received the beacons, the communication stations STA1 and STA2 energize the back-off timers while monitoring the states of the media again over the random time, respectively. In the example of FIG. 32, since the timer of the communication station STA2 has ended counting earlier, first, the communication station STA2 transmits the ATIM message to the communication station STA3. As shown in FIG. 32A, when receiving the ATIM message, the communication station STA3 feeds the message of the reception back to the communication station STA2 by transmitting an ACK (Acknowledge) packet which is an acknowledge packet to the above communication station. After the communication station STA3 has finished transmitting the ACK packet, the communication station STA1 further energizes the back-off timer while monitoring the respective states of the media over the random time. When the timer finishes counting after a time set by the timer has passed, the communication station STA1 transmits the ATIM packet to the communication station STA2. The communication station STA2 feeds the message of the reception back to the communication station STA1 by returning the ACK packet to the above communication station.

When the ATIM packet and the ACK packet are exchanged within the ATIM window, also during the following interval, the communication station STA3 energizes the receiver to receive information from the communication station STA2, and the communication station STA2 energizes the receiver to receive information from the communication station STA1.

When the ATIM window is ended, the communication stations STA1 and STA2 which hold the transmission information energize the back-off timers while monitoring the respective states of the media over the random time. In the example of FIG. 32, since the timer of the communication station STA2 has finished counting first, the communication station STA2 first transmits the information to the communication station STA3. After this transmission of the information was ended, the communication station STA1 energizes the back-off timer while monitoring again the respective states of the media over the random time, and after the timer is ended, it transmits the packet to the communication station STA2.

In the above-mentioned procedure, a communication station which has not received the ATIM packet within the ATIM window or which does not hold information de-energizes the transmitter and receiver until the next TBTT field and it becomes possible to decrease power consumption.

Next, the access contention method of the IEEE802.11 system will be described with reference to FIG. 33. In the above explanation, while we have described "communication station energizes the back-off timer while monitoring the states of the media over the random time", let us make additional explanation to this case.

In the IEEE802.11 system, four kinds of IFS are defined as packet spaces (IFS: Inter Frame Space) extending from the end of the immediately-preceding packet to the transmission of the next packet. Of the four kinds of the inter frame spaces, three inter frame spaces will be described. As shown in FIG. 33, as the IFS, there are defined SIFS (Short IFS), PIFS (PCF IFS) and DIFS (DCF IFS) in the sequential order of short inter frame space. According to the IEEE802.11, a CSMA (Carrier Sense Multiple Access) is applied as the fundamental media access procedure. Accordingly, before the transmission unit transmits some information, the communication station energizes the backoff timer over the random time while monitoring the state of the media. If it is determined that the transmission signal does not exist during this time period, then the transmission unit is given a transmission right.

When the communication station transmits the ordinary packet in accordance with the CSMA procedure (called a DCF: Distributed Coordination Function), after the transmission of some packet has been ended, the state of the media of only the DIFS is monitored. Unless the transmission signal exists during this time period, then the random backoff is made. Further, unless the transmission signal exists during this time period, the transmission unit is given a transmission right. On the other hand, when a packet such as ACK packet which has an exceptionally large emergency is transmitted, the transmission unit is allowed to transmit the packet after the SIFS packet space. Thus, it becomes possible to transmit the packet with the large emergency before the packet that is to be transmitted in accordance with the ordinary CSMA procedure. Different kinds of packet spaces IFS are defined for this reason. Packet transmission contention is prioritized depending upon whether the IFS is the SIFS or the PIFS or the DIFS. The purpose of using the PIFS will be described later on.

Next, the RTS/CTS procedure in the IEEE802.11 will be described with reference to FIGS. 34 and 35. In network under the ad hoc environment, it is generally known that a problem of a hidden terminal arises. As a methodology for solving the most part of this problem, there is known a CSMA/CA based upon the RTS/CTS procedure. The IEEE802.11 also uses this methodology.

An example of operation in the RTS/CTS procedure will be described with reference to FIG. 34. FIG. 34 shows an example of the case in which some information (DATA) is transmitted from a communication station STA0 to a communication station STA1. Before transmitting actual information, the communication station STA0 transmits an RTS (Request To Send) packet to the communication station STA1 which is an information destination station in accordance with the CSMA procedure. When the communication station STA1 received this packet, it transmits a CTS (Clear To Send) packet which feeds information indicative of the reception of the RTS packet back to the communication station STA0 to the communication station. When the communication station STA0 which is the transmission side receives the CTS packet without accident, the communication station regards that the media is clear and transmits an information (Data) packet immediately. After the communication station STA1 receives this information packet without accident, it returns the ACK packet and the transmission of one packet is ended.

Actions that will occur in this procedure will be described with reference to FIG. 35. In FIG. 35, it is assumed that a communication station STA2 may transmit information to a communication station STA3. Having confirmed by the CSMA procedure that the media is clear during a predetermined period, the communication station STA2 transmits the RTS packet to the communication station STA3. This packet is also received by the neighbor communication station STA1 of the communication station STA2. Because the communication station STA1 receives the RTS packet and becomes aware that the station STA2 intends to transmit some information, it recognizes that the media is occupied by the station STA2 until the transmission of such information is ended, and it also becomes aware of the fact that the media is occupied without monitoring the media during this time period. This work is called an NAV (Network Allocation Vector). The RTS packet and the CTS packet have durations of time in which the media is occupied in the transaction written thereon.

Returning to the description, having received the RTS packet transmitted from the communication station STA2 to the communication station STA3, the communication station STA1 becomes aware of the fact that the media is placed in the occupied state during a time period designated by the RTS packet, and hence it refrains from transmitting information. On the other hand, the communication station STA3 which received the RTS packet returns the CTS packet to the communication station to feed information indicative of the reception of the RTS packet back to the communication station STA2. This CTS packet is also received by a neighbor communication station STA4 of the communication station STA3. The communication station STA4 recognizes by decoding the content of the CTS packet that information is transmitted from the communication station STA2 to the communication station STA3, and it becomes aware of the fact that the media will be occupied during a time period designated by the CTS packet. Hence, it refrains from transmitting information.

When the above-described RTS packet and CTS packet are transmitted and received, the transmission is prohibited between "neighboring station of the communication station STA2 which is the transmission station" which could receive the RTS packet and "neighboring station of the communication station STA3 which is the reception station" which could receive the CTS packet, whereby information can be transmitted from the communication station STA2 to the communication station STA3 and the ACK packet can be returned without being disturbed by the sudden transmission from the neighboring station.

Next, a band reserve means in the IEEE802.11 system will be described with reference to FIG. 36. In the above-mentioned IEEE802.11 system access control, access contention based on the CSMA procedure is executed, and hence it is impossible to guarantee and maintain a constant band. In the IEEE802.11 system, a PCF (Point Coordination Function) exists as a mechanism for guaranteeing and maintaining the band. However, the basis of the PCF is polling and it does not operate in the ad hoc mode but it operates only in the infrastructure mode under control of the access point. Specifically, in order to execute the access control while the band is being guaranteed, a coordinator such as an access point is required and all controls are carried out by the access point.

For reference, operations of the PCF will be described with reference to FIG. 36. In FIG. 36, it is assumed that the communication station STA0 is the access point and that the communication stations STA1 and STA2 joined in the BSS managed by the access point STA0. Also, it is assumed that the communication station STA1 transmits information while it guarantees the band.

Having transmitted the beacon, for example, the communication station STA0 performs polling to the communication station STA1 at the SIFS space (CF-Poll in FIG. 36). The communication station STA1 which received the CF-Poll is given a right to transmit data and is thereby allowed to transmit data at the SIFS space. As a result, the communication station STA1 transmits the data after the SIFS space. When the communication station STA0 returns the ACK packet for the transmitted data and one transaction is ended, the communication station STA0 again performs polling to the communication station STA1.

FIG. 36 shows also the case in which polling of this time is failed due to some reason, that is, the state in which the polling packet shown as the CF-Poll follows the SIFS space. Specifically, when the communication station STA0 becomes aware that no information is transmitted from the communication station STA1 after the SIFS space elapsed since it has performed polling, it regards that the polling is failed and performs polling again after the PIFS space. If this polling is successful, then data is transmitted from the communication station STA1 and the ACK packet is returned. Even when the communication station STA2 holds the transmitted packet during a series of this procedure, since the communication station STA0 or STA1 transmits information at the SIFS or PIFS space before the DIFS time space elapses, the right to transmit information is never moved to the communication station STA2 and hence the communication station STA1 to which the polling is performed is constantly given a priority.

Official Gazette of Japanese laid-open patent application No. 8-98255 discloses an example of access control of such wireless communication.

When access control of wireless communication is carried out without such master control station (access point), as compared with the case in which communication is carried out with the master control station, there were various restrictions. To be concrete, the following problems arise.

Problem 1: Selection of Coordinator

For example, as shown in FIG. 37, let it be assumed that a network is configured by the above-mentioned IEEE802.11 system when communication stations 10 to 17 are located in the scattered state and communication ranges 10a to 17a in which the communication stations 10 to 17 can directly communicate with each other. In such case, if the network is configured in the infrastructure mode, then there arises a problem of how to select a communication station that should be operated as the access point (coordinator). In the IEEE802.11 system, a communication station accommodated within the BSS may communicate with only a communication station which belongs to the same BSS, and the access point is operated as a gateway to other BSS. In order to efficiently make networking on the whole of the system, there are various arguments such as to select which location of the communication station as the access point or how to configure again the network when the access point is de-energized. Although it is desirable that the network could be configured without the coordinator, the infrastructure mode of the IEEE802.11 system cannot meet with such requirements.

Problem 2: Disagreement of Achievable Area

In the ad hoc mode of the IEEE802.11 system, although the network can be configured without the coordinator, it is assumed that the IBSS is constructed by a plurality of communication stations located at the surrounding areas. For example, as shown in FIG. 37, it is assumed that the communication stations 10, 11, 12, 13 (STA0, STA1, STA2, STA3)

are accommodated within the same IBSS. Then, although the communication station 11 (STA1) can communicate with the communication stations 10, 12, 13 (STA0, STA2, STA3), the communication station 10 (STA0) cannot directly communicate with the communication station 12 (STA2). In such case, according to the beacon transmission procedure of the IEEE802.11 system, it is frequently observed that the communication station 10 (STA0) and the communication station 12 (STA2) transmit the beacons at the same time, and at that time, the communication station 11 (STA1) becomes unable to receive a beacon, which causes a problem.

Further, as shown in FIG. 37, for example, let it be assumed that the communication stations 15, 16, 17 (STA5, STA6, STA7) constitute an IBSS (IBSS-A) and that the communication stations 10, 11, 12, 13 (STA0, STA1, STA3, STA3) constitute an IBSS (IBSS-B). At that time, since the two IBSSes are operating completely independently, an interference problem does not arise between the two IBSSes. Here, let it be considered the case in which a new communication station 14 (STA4) appears on the network. Then, the communication station 14 (STA4) is able to receive both signals from the IBSS-A and the IBSS-B. When the two IBSSes are coupled together, although the communication station STA4 can enter both of the IBSS-A and the IBSS-B, the IBSS-A is operated in accordance with the rule of the IBSS-A and the IBSS-B is operated in accordance with the rule of the IBSS-B. Then, there is a possibility that collision of the beacons and collision of the ATIM packets will occur, which also raises a problem.

Problem 3: Method of Realizing Power Save Mode

In the ad hoc mode, the power save mode can be realized by transmitting the ATIM packets with each other within the ATIM window according to the random access. When information to be transmitted is a small amount of information such as bits, an overhead required by the ATIM packets increases, and a methodology in which the ATIM packets are to be exchanged according to the random access is very inefficient.

Problem 4: Band Reserve in Network without Coordinator

Also, according to the IEEE802.11 system, in the ad hoc mode, a mechanism for carrying out band reserve does not exist, and hence there is no method but to constantly follow the operation of the CSMA procedure.

Problem 5: Incompleteness of RTS/CTS Procedure

In the RTS/CTS procedure of the IEEE802.11 system, not only a communication station which received the CTS packet but also a communication station which received the RTS packet is prohibited from transmitting information. However, in the case shown in FIG. 35, the station that is prohibited from transmitting information is only the communication station STA4 and the communication station STA1 does not affect "transmission of DATA from the communication station STA2 to the communication station STA3". In the RTS/CTS procedure, to prohibit the communication station which received the RTS packet from transmitting information requires a large margin to the safety side and this is one of the factors which degrade a system throughput.

Problem 6: Considerations on Separation of BBSES by TDMA

In the scenario described in the above-mentioned Problem 2 (in FIG. 37, the communication stations STA5, STA6, STA7 constitute the IBSS (IBSS-A) and the communication stations STA0, STA1, STA2, STA3 constitute the IBSS (IBSS-B)), as a method for solving the problem which arises when the communication station STA4 appears to couple both of the IBSSes, there exists a method for separating the IBSS-A and the IBSS-B by a TDMA (Time Division Multiple Access: time division multiple access) system. An example of this case is shown in FIG. 38. This is a method used in an ARIB STD-T70 (HiSWANa) system and the like. A time zone that is exclusively used for a sub-network is constructed in a frame of some BBS. However, according to this method, spatial recycling of resources is aborted and hence utilization ratio is decreased considerably, which also causes a problem.

In view of the aforesaid aspects, it is an object of the present invention to provide excellent wireless communication system, wireless communication apparatus and wireless communication method and computer program in which the problems arising when a wireless system such as a wireless LAN is constructed as a decentralized distributed type network without control and controlled relationship such as a master station and slave stations can be solved.

Other object of the present invention is to provide excellent wireless communication system, wireless communication apparatus and wireless communication method and computer program in which data can be transmitted while collisions are being avoided in a decentralized distributed type network.

A further object of the present invention is to provide excellent wireless communication system, wireless communication apparatus and wireless communication method and computer program in which collisions of beacons can be suitably avoided among a plurality of communication stations in a network configured when communication stations transmit beacons with each other.

Yet a further object of the present invention is to provide excellent wireless communication system, wireless communication apparatus and wireless communication method and computer program in which a decentralized distributed type wireless network can be suitably formed while collisions of beacons that communication stations transmitted with each other can be avoided.

DISCLOSURE OF THE INVENTION

The present invention is made in view of the aforesaid aspect. According to an aspect of the present invention, there is disclosed in connection with a wireless communication system composed of a plurality of communication stations without relationship of control station and controlled stations, wherein respective communication stations transmit beacons in which information concerning a network is written with each other to construct the network.

However, "system" refers to something of logical set of a plurality of apparatus (or function modules that can realize specific function) regardless of whether each apparatus or function module is accommodated within a single housing or not.

Under the decentralized distributed type communication environment, each communication station lets other neighbor (within a communication range) communication station become aware of its existence by transmitting beacon information to other neighbor communication station at a predetermined time space and also lets other communication station become aware of the network configuration. Also, the communication station executes scan operation on each channel and detects by receiving a beacon signal whether it joined the communication range of the adjacent station. Further, the communication station can recognize the network configuration by deciphering information written on the beacon.

Also, each communication station transmits neighbor apparatus information concerning beacon transmission timing contained in the beacon signal. In such case, the communication station can obtain not only network information of the adjacent station from which the communication station can directly receive the beacon but also beacon information of the next station of the adjacent station from which the local station cannot receive the beacon but the adjacent station can receive the beacon, that is, a hidden terminal.

In such decentralized distributed type network, a new communication station which joins the network attempts to execute scan operation, that is, to continuously receive a signal during a time period longer than a superframe length to confirm the presence of the beacon transmitted from the neighboring station. If the communication station cannot receive the beacon from the neighboring station in this process, then the communication station sets proper beacon transmission timing. On the other hand, if the communication station can receive the beacon transmitted from the neighboring station, then the communication station sets timing at which any one of existing stations does not transmit the beacon to the beacon transmission timing of the local station with reference to neighbor apparatus information described in each received beacon.

Here, in the wireless communication network according to the present invention, each communication station obtains a traffic priority use period as it transmits the beacon. Then, each communication station may transmit a regular beacon only once at the above-described predetermined time space and may be allowed to transmit more than one auxiliary beacon composed of signals similar to the regular beacon.

Also, according to a second aspect of the present invention, in a computer program written in the computer readable format such that processing for carrying out wireless communication operation under the decentralized distributed type communication environment configured when a specific control station is not located and respective communication stations transmit beacons with information concerning a network written thereon with each other at a predetermined time space may be executed, a computer program is comprised of a beacon signal generating step for generating a beacon signal with information concerning the local station written thereon, a beacon signal analyzing step for analyzing a beacon signal received from a neighboring station and a timing control step for controlling beacon transmission timing.

The computer program according to the second aspect of the present invention is obtained by defining a computer program written in the computer readable format so that predetermined processing may be executed on the computer system. In other words, when the computer program according to the second aspect of the present invention is installed on the computer system, cooperative action is demonstrated on the computer system and thereby the computer system is operated as a wireless communication apparatus. A plurality of wireless communication apparatus may be activated to construct a wireless network with similar action and effects to those of the wireless communication system according to the first aspect of the present invention.

According to the present invention, in a decentralized distributed type network having a control station/controlled station relationship such as a master station and slave stations, it is possible to provide excellent wireless communication system, wireless communication apparatus and wireless communication method and computer program in which data can be transmitted while collisions of beacons can be avoided.

Also, according to the present invention, in a network configured when communication stations transmit beacons with each other, it is possible to provide excellent wireless communication system, wireless communication apparatus and wireless communication method and computer program in which collisions of beacons among a plurality of communication stations can be avoided suitably.

Also, according to the present invention, it is possible to provide excellent wireless communication system, wireless communication apparatus and wireless communication method and computer program in which a decentralized distributed type wireless network can be suitably formed while collisions of beacons that respective communication stations transmit with each other can be avoided.

BEST MODE FOR CARRYING OUT THE INVENTION

An embodiment according to the present invention will be described below with reference to FIGS. 1 to 29.

A propagation line of communication assumed in this embodiment of the present invention is wireless and it is also assumed that a network is constructed among a plurality of devices by using a single transmission medium (when a link is not separated by a frequency channel). This will apply for the case in which a plurality of frequency channels exists as transmission mediums) as well. Communication assumed in this embodiment is a store and forward type traffic and hence information is transferred at the packet unit. Also, processing at each communication station which will be described below is fundamentally processing executed by all communication stations joined the network. However, depending on the cases, all communication stations comprising the network do not always execute the processing which will be described below.

Figure 1:
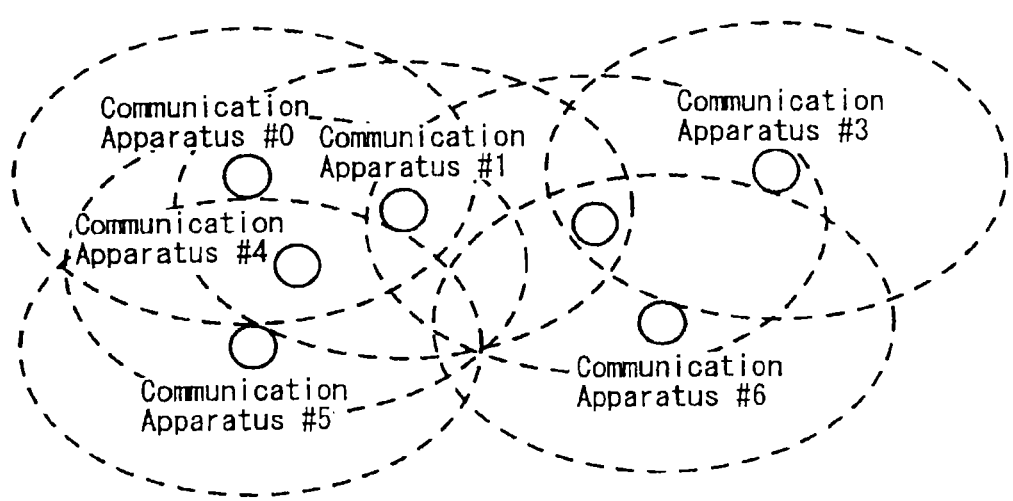
FIG. 1 is an explanatory diagram showing an example in which communication apparatus are located according to an embodiment of the present invention.

FIG. 1 shows an example of the manner in which communication apparatus comprising the wireless communication system according to an embodiment of the present invention are located. In this wireless communication system, a specific control station is not located and respective communication stations are operated in a decentralized distributed fashion to form a so-called ad hoc network. This sheet of drawing shows the manner in which communication apparatus #0 to #6 are distributed on the same space.

Also, in this sheet of drawing, communication ranges of the respective communication apparatus are shown by broken lines. Communication apparatus can communicate with other communication apparatus located within such communication range and these communication ranges are defined as the ranges in which a signal transmitted from the local station interfere with signals transmitted from other communication apparatus. Specifically, the communication apparatus #0 is located within the range in which it can communicate with neighbor communication apparatus #1, #4, the communication apparatus #1 is located within the range in which it can communicate with the neighbor communication apparatus #0, #2, #4, the communication apparatus #2 is located within the range in which it can communicate with the neighbor communication apparatus #1, #3, #6, the communication apparatus #3 is located within the range in which it can communicate with the neighbor communication apparatus #2, the communication apparatus #4 is located within the range in which it can communicate with the neighbor communication apparatus #0, #1, #5, the communication apparatus #5 is located within the range in which it can communicate with the neighbor communication apparatus #4, and the communication apparatus #6 is located within the range in which it can communicate with the neighbor communication apparatus #2.

When communication is made between certain specific communication apparatus, a communication apparatus which can receive information from one communication apparatus of the apparatus being called but which cannot receive information from other communication apparatus, that is, "hidden terminal" exists.

Figure 2:
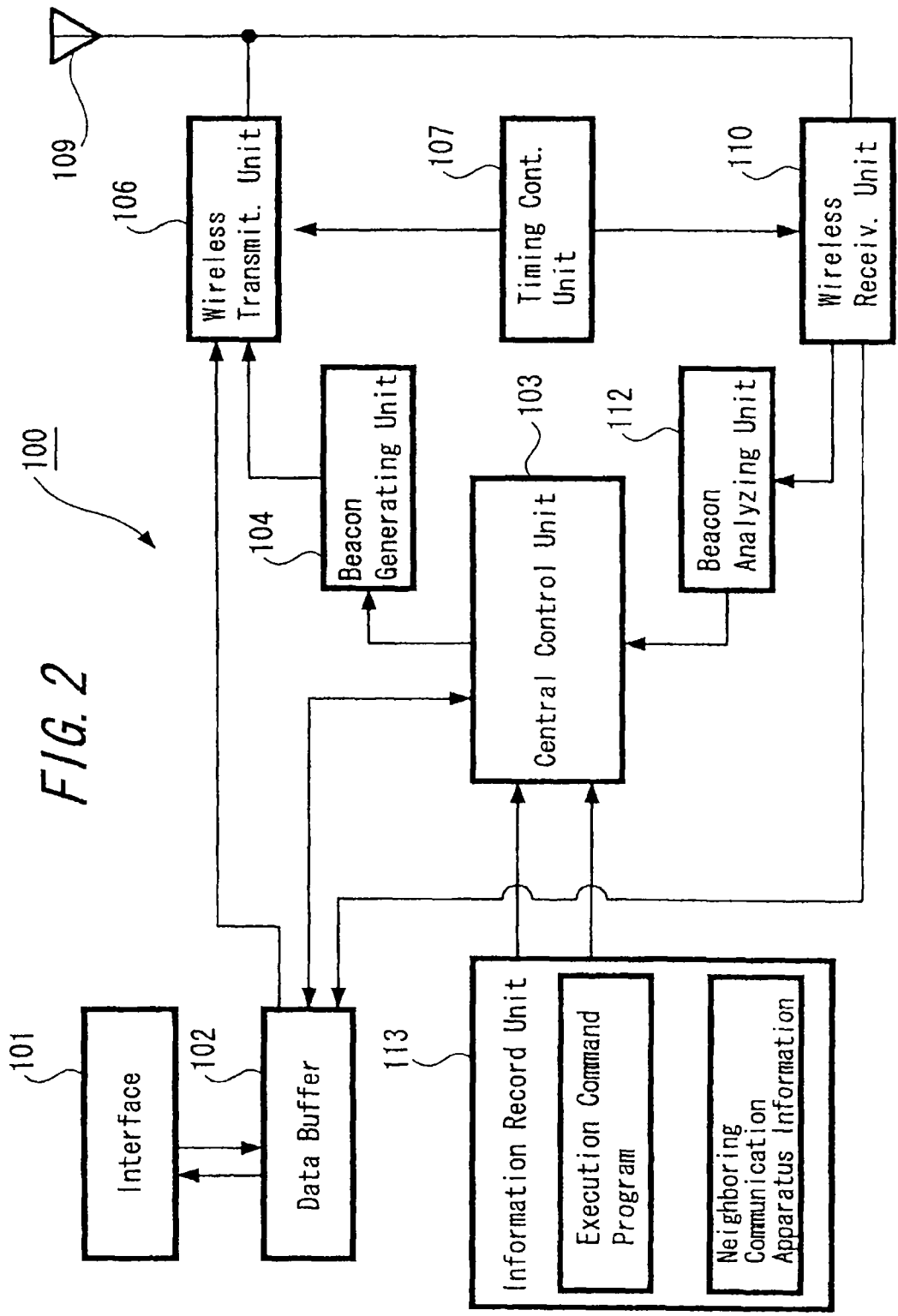
FIG. 2 is a block diagram showing an example of an arrangement of a communication apparatus according to an embodiment of the present invention.

FIG. 2 is a block diagram schematically showing function and arrangement of a wireless communication apparatus which is operated as a communication station in the wireless network according to the embodiment of the present invention. Under a decentralized distributed type communication environment in which a control station is not located, the illustrated wireless communication apparatus can form a network by effectively carrying out channel access within the same wireless system while collisions are being avoided.

As illustrated, a wireless communication apparatus 100 is composed of an interface 101, a data buffer 102, a central control unit 103, a beacon generating unit 104, a wireless transmission unit 106, a timing control unit 107, an antenna 109, a wireless reception unit 110, a beacon analyzing unit 112 and an information storage unit 113.

The interface 101 exchanges a variety of information between it and an external device (for example, a personal computer (not shown), etc.) connected to this wireless communication apparatus 100.

The data buffer 102 is used to temporarily store data transmitted from a device connected through the interface 101 or data received through a wireless transmission line before such data is transmitted via the interface 101.

The central control unit 103 controls transmission and reception of a series of information in the wireless communication apparatus 100 and performs access control of a transmission line in a centralized fashion. The central control unit 103 performs operation control such as collision avoidance when beacons collide with each other.

The beacon generating unit 104 generates beacon signals that are periodically exchanged between it and the neighbor wireless communication apparatus. In order for the wireless communication apparatus 100 to use the wireless network, there should be stipulated the position at which its own beacon is transmitted and the position at which it receives a beacon from the neighboring station. This information is stored in the information storage unit 113 and is transmitted to neighboring wireless communication apparatus in the form in which it is written in the beacon signal. An arrangement of the beacon signal will be described later on. Since the wireless communication apparatus 100 transmits a beacon at the beginning of a transmission frame period, a transmission frame period in the channel used by the wireless communication apparatus 100 is defined by a beacon space.

The wireless transmission unit 106 carries out predetermined modulation processing in order to transmit data temporarily stored in the data buffer 102 and a beacon signal via radio waves. Also, the wireless reception unit 110 receives information and a beacon signal transmitted from other wireless communication apparatus at a predetermined time.

Various communication systems applicable to wireless LAN, for example, which is suitable for relatively short-distance communication, can be applied to the wireless transmission and reception system in the wireless transmission unit 106 and the wireless reception unit 110. To be concrete, it is possible to use a UWB (Ultra Wide Band) system, an OFDM (Orthogonal Frequency Division Multiplexing: orthogonal frequency division multiplexing) system, a CDMA (Code Division Multiple Access: code division multiple access) system and the like.

The antenna 109 transmits a signal to other wireless communication apparatus through a predetermined frequency channel or collects signals transmitted from other wireless communication apparatus. In this embodiment, the communication apparatus includes a single antenna and is unable to receive and transmit signals concurrently.

The timing control unit 107 controls timing at which a wireless signal should be transmitted and received. For example, the timing control unit controls its own beacon transmission timing at the beginning of the transmission frame period, timing at which it receives a beacon from other communication apparatus, timing at which it transmits and receives data between it and other communication apparatus and a scan operation period, etc.

The beacon analyzing unit 112 analyzes the existence of the neighbor wireless communication apparatus by analyzing the beacon signal received from the adjacent station, For example, information such as the beacon reception timing of the adjacent station and the neighboring station beacon reception timing is stored in the information storage unit 113 as neighbor apparatus information.

The information storage unit 113 stores therein an execution procedure command (program in which a collision avoidance processing procedure and the like are described) such as a series of access control operations executed by the central control unit 103 and neighbor apparatus information obtained from the analyzed result of the received beacon.

In the decentralized distributed type network according to this embodiment, each communication station lets other neighbor (that is, within a communication range) station become aware of its existence by transmitting beacon information at a predetermined time space on a predetermined channel and also informs other communication station of the network arrangement. The beacon transmission period is defined as "superframe" (Super frame) of which duration is 80 milliseconds, for example.

A new communication station that joins the network can recognize that it entered the communication range by receiving the beacon signal from the neighboring station through scan operation and it can recognize the network arrangement by deciphering information described in the beacon. Then, the new communication station sets its own beacon transmission timing to timing at which a beacon is not transmitted from the neighboring station in gentle synchronism with the beacon reception timing.

Figure 17:
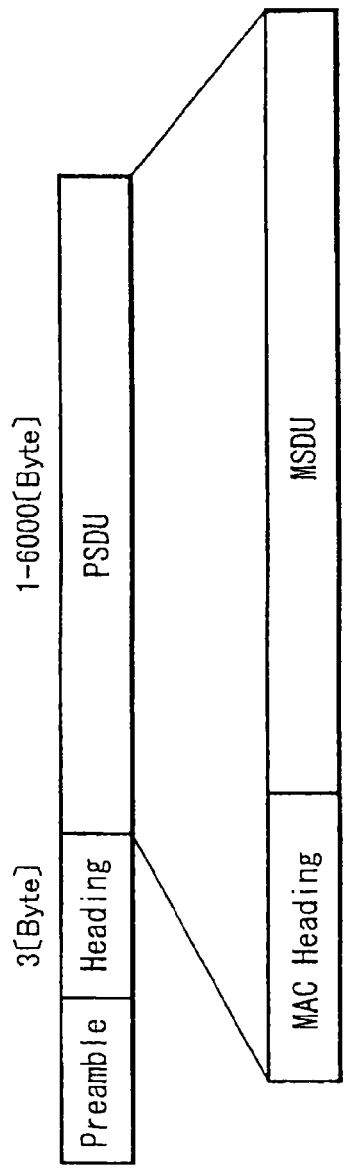
FIG. 17 is an explanatory diagram showing an example of a packet format according to an embodiment of the present invention.

Next, FIG. 17 shows an example of a packet format according to this embodiment. A preamble composed of a unique word is added to the beginning of the packet in order to demonstrate the existence of the packet. In a heading area transmitted immediately after the preamble, there are stored attribute of this packet, length, transmission power and a payload portion transmission rate if PHY is in the multi-transmission rate mode. The heading area decreases its transmission rate so that a predetermined SNR may decrease several [dB] as compared with that of the payload portion. This heading area is different from a so-called MAC header and the MAC header is contained in the Payload portion. The payload portion is the portion depicted as PSDU (PHY Service Data Unit) in FIG. 17 and in which there is stored a bearer bit string containing a control signal and information. The PSDU is composed of the MAC header and an MSDU (MAC Service Data Unit), and the MSDU portion stores therein a data string transferred from a high-order layer.

In the following description, in order to describe the present invention concretely, it is assumed that duration of the preamble is 8 [μsec], a bit rate of the payload portion is 100 Mbps upon transmission and that the heading area is composed of 3 bytes and transmitted at 12 [Mbps]. Specifically, when one PSDU is transmitted and received, there occurs an overhead of 10 [μsec] (=preamble 8 [μsec]+heading 2 [μsec]).

A fundamental access procedure in this embodiment is the same CSMA/CA as that of the prior art, and information is transmitted after it was confirmed that the media is clear before information is transmitted.

Beacon Transmission Procedure:

First, a beacon transmission procedure of each communication station according to this embodiment will be described with reference to FIG. 3. Each communication station that joined the network transmits a beacon periodically in order to let the neighboring station become aware of the existence of the communication station. Here, the period is assumed to be 80 [msec] and let us describe the present invention with reference to the case in which the beacon is transmitted at every 80 [msec]. However, the above period is not always limited to 80 [msec].

Assuming that information transmitted by the beacon is 100 bytes, then a time required by transmission becomes 18 [μsec]. Since the beacon is transmitted once at 80 [msec], a beacon media occupying rate of one communication station is as sufficiently small as 1/4444. Although it seem to be useless that a beacon is transmitted even when the transmission signal does not arrive at the station, the transmission time rate is as sufficiently small as 1/4444, and this problem does not become serious.

The respective communication stations are gently synchronized with each other while receiving and confirming the beacons transmitted from the neighbor communication stations. When a new communication station joined the network, the new communication station sets beacon transmission timing of the local station to timing at which a beacon is not transmitted from the neighbor communication station. An example thereof will be described below.

When the neighbor communication station does not exist, as shown in FIG. 3A, a communication station [number 01] can begin to transmit a beacon at proper timing. B01 shows transmission position (timing) of a beacon transmitted from the communication station [number 01]. The beacon transmission period is defined as superframe (Superframe) and a beacon space is 80 [msec]. Also in FIGS. 3B, 3C, 3D, positions depicted by communication station numbers added to B show communication timing.

After that, the newly-joined communication station starts transmitting a beacon in substantially the center of a time zone with the longest beacon space in the range in which it can receive the beacon such that its beacon may not collide with beacons transmitted from other communication stations which were already located within the superframe. For example, when a new communication station [number 02] appears in the beacon transmission state shown in FIG. 3A, it starts transmitting a beacon at the middle timing of the beacon space of the communication station [number 01] while it is recognizing the existence of the communication station 01.

After that, a new communication station which joined the communication range sets its own beacon transmission timing so that it may not collide with the layout of the existing beacons. At that time, since each communication station obtains a prioritized use area (TPP) immediately after it has transmitted the beacon (as will be described later on), it is preferable that beacon transmission timing of each communication station should be equally dispersed within the transmission frame period rather than crowded from a transmission efficiency standpoint. Accordingly, in this embodiment, the new communication station can start transmitting the beacon in substantially the middle of the time zone with the longest beacon space within the range in which it can receive the beacon from other communication station.

Further, when a new communication station [number 03] appears in the state shown in FIG. 3B, it starts transmitting a beacon in the middle timing of the beacon space while it is confirming the existence of the communication state [number 01] and the communication station [number 02]. After that, according to a similar algorithm, as shown in FIGS. 3C and 3D, the beacon space is narrowed as a neighbor communication station occurs. However, as the beacon space is narrowed in this manner, the band (transmission frame period) is occupied by the beacons so that a minimum beacon space should be stipulated such that the band may not be filled with the beacons. For example, when the beacon space is stipulated as the minimum beacon space Bmin=625 [μsec], only 128 communications can be accommodated within the range in which radio waves can be received and transmitted at maximum.

Figure 4:
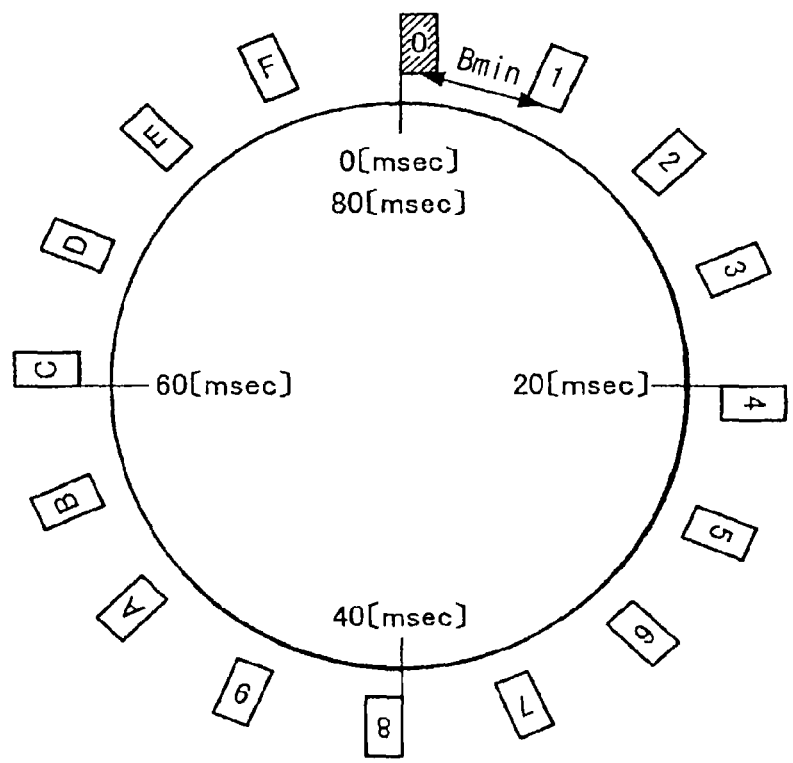
FIG. 4 is a timing chart showing an example of timing at which beacons are transmitted according to an embodiment of the present invention.

FIG. 4 shows an example of an arrangement of beacon transmission timing which can be located within the superframe. However, the illustrated example expresses the elapse of time in the superframe of 80 milliseconds as a clock of which hand is rotated in the clockwise direction on the circular ring.

In the example shown in FIG. 4, 16 positions 0 to F from ranging 0 to F in total are constructed as times at which beacons can be transmitted, that is, "slots" in which beacon transmission timing can be located. As had already been described with reference to FIG. 3, let it be assumed that beacons are located in accordance with the algorithm in which the beacon transmission timing of the newly-joined station is sequentially set to at substantially the middle timing of the beacon space set by the existing communication station. When Bmin is stipulated as 5 milliseconds, only 16 beacons can be located at maximum per superframe. That is, more than 16 communication stations cannot join the network.

Figure 3:
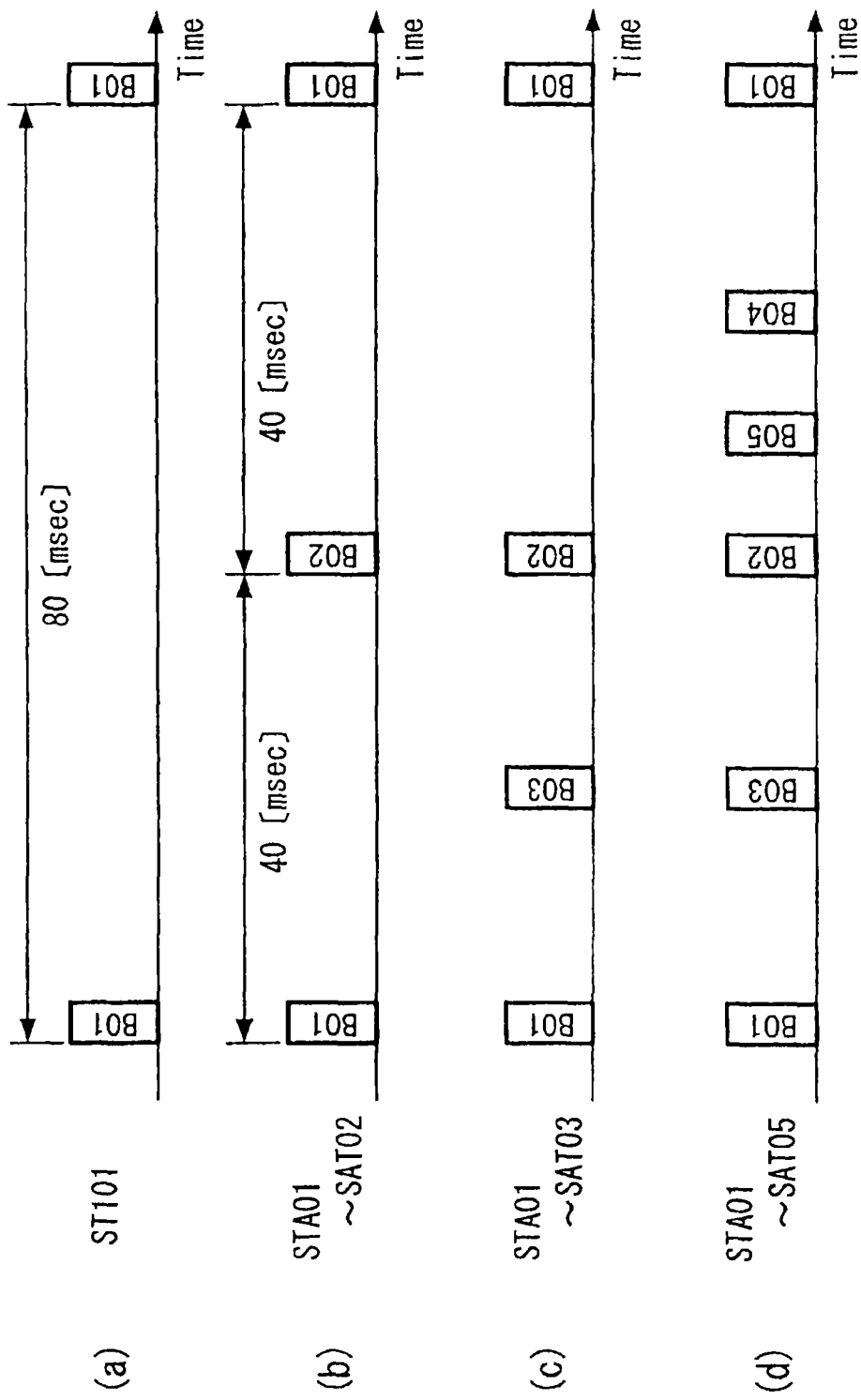
FIG. 3 is a timing chart showing an example of a wireless communication system according to an embodiment of the present invention.

Although not shown explicitly in FIGS. 3 and 4, each beacon is transmitted at a time which is intentionally displaced from a TBTT (Target Beacon Transmission Time) by a small time offset. This will be referred to as "TBTT offset". In this embodiment, a TBTT offset value is determined by a pseudorandom number. This pseudorandom number is determined by a pseudorandom sequence TOIS (TBTT Offset Indication Sequence) that is uniquely determined and the TOIS is updated at every superframe period.

With the TBTT offset, even when two communication stations have beacon transmission timings located at the same slot on the superframe, actual beacon transmission times can be displaced. Hence, even when the beacons collide with each other in a certain superframe period, the respective communication stations can transmit and receive their beacons in another superframe period (or the neighbor communication station can receive the beacons from both of the above communication stations) so that the communication station can recognize that the beacon of the local station collided with other beacons. The communication station includes the TOIS set at every superframe period in the beacon information and transmits this resultant beacon information to the neighboring station (which will be described later on).

Also, according to this embodiment, each communication station is ought to carry out reception operation before and after the beacon transmitted from the local station when it does not transmit and receive data. Also, even when each communication station does not transmit and receive data, it is ought to carry out scan operation by continuously energizing the receiver over one superframe once per several seconds to thereby confirm whether or not the presence of the beacon from the neighboring station is changed or whether or not the TBTT of each neighboring station is displaced. Then, if it is determined that the TBTT is displaced, then a target beacon transmission time in which a displacement within −Bmin/2 milliseconds is stipulated as TBTT with reference to a TBTT group recognized by the local station is defined as "advanced target beacon transmission time" and a target beacon transmission time in which a displacement within +Bmin/2 milliseconds is stipulated as TBTT is defined as "delayed target beacon transmission time", and a time is corrected in accordance with the most delayed TBTT.

Figure 5:
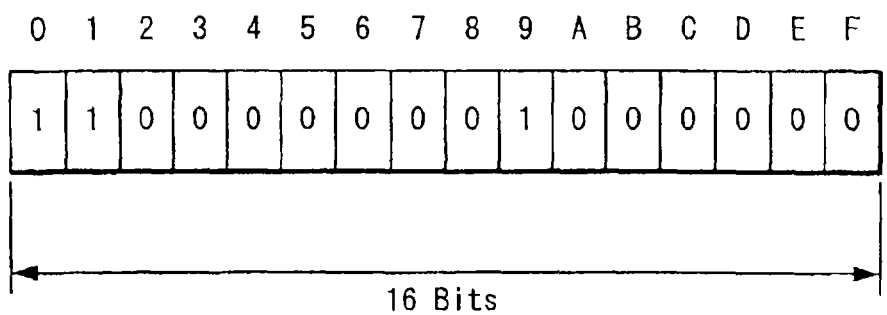
FIG. 5 is an explanatory diagram showing part of beacon description information according to an embodiment of the present invention.

NBOI Field:

As one of information transmitted by a beacon, FIG. 5 shows an example of the manner in which a Neighboring Beacon offset Information (NBOI) field is described. The position of the beacon that can be received by the local station (reception time) is written on the NBOI field by the relative position (relative time) from the position (transmission time) of the beacon of the local station in the form of a bit map. The example shown in FIG. 5 describes the case in which only 16 kinds of beacon transmission positions can exist at the minimum space Bmin=5 [msec], by way of example, and hence the NBOI field length is 16 bits but it may not always be limited to 16 bits.

The example of FIG. 5 shows an example of the NBOI field indicative of the message that "the communication station (number 0) in FIG. 4 can receive the beacons from the communication station [number 1] and the communication station [number 9]". With respect to the bits corresponding to the relative positions of the beacons that can be received, the relative position at which the beacon is received is depicted by a mark and the relative position at which the beacon is not received is depicted by a space. In the example of FIG. 5, 0th bit, first bit and ninth bit are depicted by the marks. The mark on the 0th bit indicates that the local station transmitted the beacon, and the mark on the first bit indicates that the beacon is received at timing delayed from the TBTT field of the beacon by a delay amount of Bmin*1. Similarly, the mark on the ninth bit indicates that the beacon is received at timing delayed from the TBTT field of the beacon by a delay amount of Bmin*9.

Although the details will be described later on, bits corresponding to timing at which the beacon is not received may be depicted by a mark for other purpose such as when an auxiliary beacon is transmitted.

NBAI Field:

Also, similarly to the NBOI field, a Neighboring Beacon Activity Information (NBAI) field is defined as one of information similarly transmitted by the beacon. The NBAI field describes the position (reception time) of the beacon that is actually received by the local station based upon the relative position of the beacon from the local station in the form of a bit map. Specifically, the NBAI field indicates that the local station is set to the active state in which it is able to receive a beacon.

Further, based upon the information of the NBOI field and the NBAI field, it is possible to provide information in which the local station receives a beacon at the beacon position within the superframe. Specifically, based on the NBOI field and the NBAI field contained in the beacon, the following two-bit information is transmitted to each communication station.

| NBAI | NBOI | Description |
| --- | --- | --- |
| 0 | 0 | BEACON IS NOT RECOGNIZED AT CORRESPONDING TIME |
| 0 | 1 | BEACON IS RECOGNIZED AT CORRESPONDING TIME |
| 1 | 0 | COMMUNISCATION STATION IS SET TO ACTIVE STATE AT CORRESPONDING TIME |
| 1 | 1 | COMMUNICATION STATION IS RECEIVING BEACON AT CORRESPONDING TIME |

Figure 6:
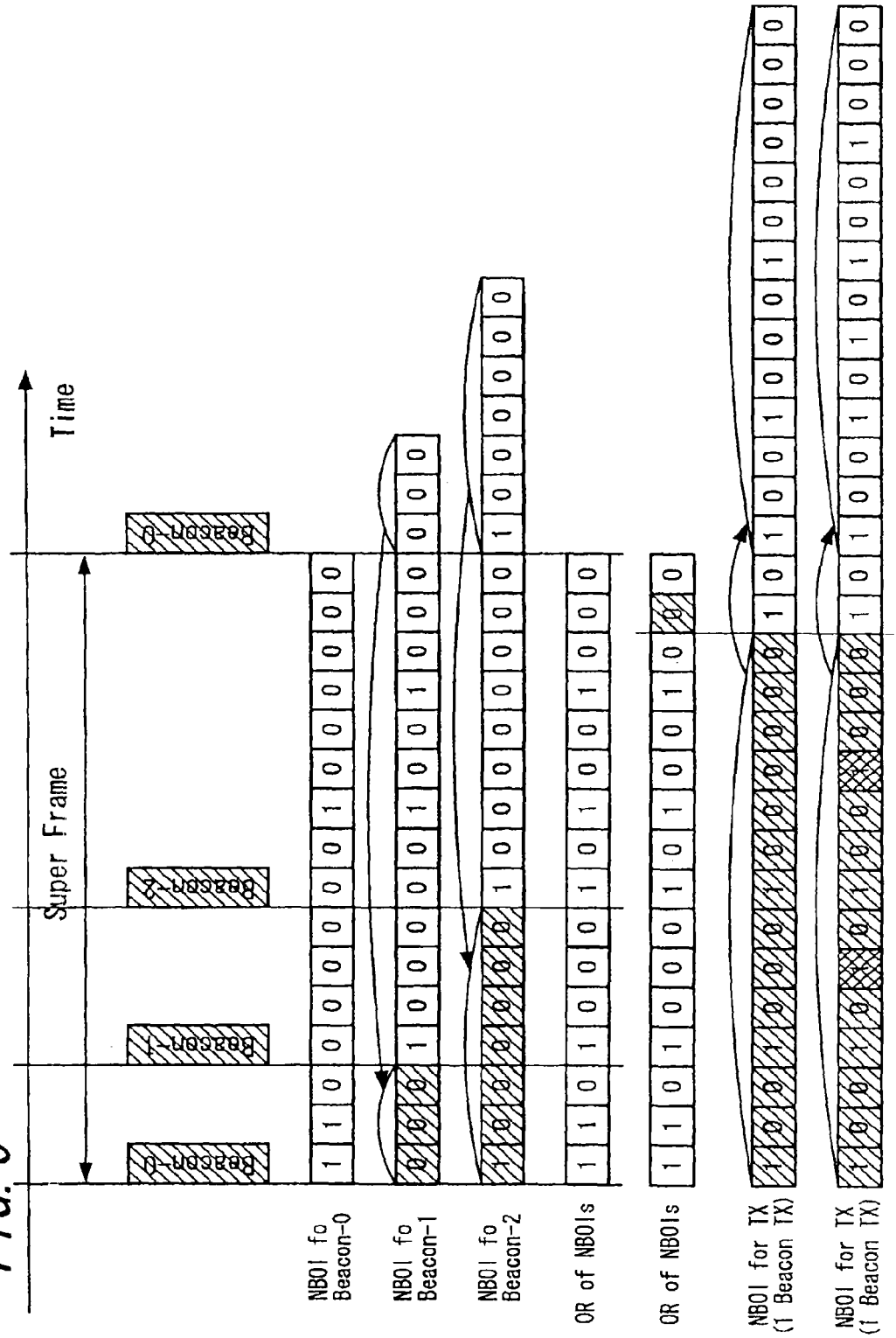
FIG. 6 is an explanatory diagram showing an example of NOBI and NBAI processing procedures according to an embodiment of the present invention.

OR-Processing of NBOI/NBAI:

FIG. 6 shows the manner in which a communication station A which joined the network sets the TBTT field of the local station based upon the NBOI field of each beacon obtained from the beacons received from the neighboring station by scan operation.

Let it be assumed that the communication station could receive the beacons from the stations 0 to 2 during the superframe by scan operation.

The beacon reception time of the neighboring station is treated as the relative position relative to the regular beacon of the local station and the NBOI field writes this beacon reception time in the bit map format (mentioned hereinbefore). Accordingly, the communication station A shifts the NBOI fields of the three beacons received from the neighboring stations and arranges the bit corresponding positions on the time axis, whereafter this communication station calculates a sum of NBOI bits of each timing to thereby synthesize the NBOI bits for reference. A procedure thereof will be described concretely. A beacon 1 is received with a delay of three slots with reference to the transmission timing of a beacon 0. The communication station stores this information in a memory and so on. Then, three slots of the NBOI field contained in the beacon 1 are shifted to the beginning and this information is stored in a suitable means such as a memory (second row in FIG. 6)). Similar processing is effected on the beacon 2 (third row in FIG. 6).

A sequence obtained after the NBOI fields of the neighboring stations were synthesized and referred to is "1101, 0001, 0100, 1000" shown by "OR of NBOIs" in FIG. 6. "1" indicates the relative position of timing at which the TBTT field was already set within the superframe, and "0" indicates the relative position of timing at which the TBTT field is not yet set. In this sequence, the place in which the space (zero) becomes the longest run-length becomes a nominated place where a new beacon is located. In the example shown in FIG. 6, the longest run-length is 3 and two nominated places exist. Then, the communication station A determines 15th-bit timing as the TBTT field of the regular beacon of the local station.

The communication station A sets the 15th-bit time as the TBTT field of the regular beacon of the local station (that is, the leading portion of the superframe of the local station) and starts transmitting the beacon. At that time, the NBOI field in which the communication station A transmits the beacon writes each reception time of the beacons of the communication stations 0 to 2 which can receive the beacons in the bit map format in which the bit positions corresponding to the relative positions from the transmission time of the regular beacon of the local station are marked. This is shown as "NBOI for TX (1 Beacon TX) in FIG. 10.

When the communication station A transmits the auxiliary beacon for the purpose of obtaining a prioritized transmission right and the like, after that, this communication station searches the longest run-length of the space (zero) of the sequence shown by "OR of NBOIs" in which the NBOI field of the neighboring station is synthesized and sets a transmission time of the auxiliary beacon to the thus searched space. The example of FIG. 10 assumes the case in which the communication station transmits two auxiliary beacons, and the transmission timing of the auxiliary beacons is set to the times of 6th-bit and 11th-bit spaces. In this case, in the NBOI field during which the communication station A transmits the beacon, in addition to the relative positions of the regular beacon of the local station and the beacons received from the neighboring stations, the positions at which the local station transmits the auxiliary beacon (relative position to the regular beacon) also are marked and presented as shown by "NBOI for Tx (3 Beacon Tx)".

When each communication station sets the beacon transmission timing TBTT of the local station by the above-mentioned processing procedure and transmits the beacon, under the condition in which each communication station is in the stationary state and the range in which radio waves reach is not fluctuated, it is possible to avoid the beacons from colliding with each other. Also, the auxiliary beacon (or a plurality of signals similar to the beacon) is transmitted within the superframe in response to a degree of priority of transmission data, whereby resources can be assigned with a priority and Qos communication can be provided. Also, since each communication station can independently understand saturation of the system with reference to the number of beacons (NBOI fields) received from the neighboring station, the present invention, even though it is the distributed control system, can accommodate prioritized traffic while considering saturation of the system at every communication station. Further, since each communication station studies the NBOI field of the received beacon so that the beacon transmission times may not collide with each other, even when a plurality of communication stations accommodates the prioritized traffic, it is possible to avoid the beacon transmission times from frequently colliding with each other. As described above, when the new communication station joins the network, the sum of the NBOI fields obtained from the beacons received from the respective communication stations is calculated so that the center of the interval in which the run-length of the space becomes longest is determined as the beacon transmission timing.

While the above description is the example in which the sum of the NBOI fields are calculated by OR, a sum (OR) of the NBAI fields is calculated by a similar procedure, whereby a beacon is not transmitted in the beacon transmission time of the marked timing under control.

Specifically, when the communication station transmits some information, the beacon transmitted from the neighbor communication station is received and a sum (OR) of the NBAI fields obtained from the beacons received from the respective communication stations is calculated so that the beacon is not transmitted in the beacon transmission time of the marked timing.

Figure 7:
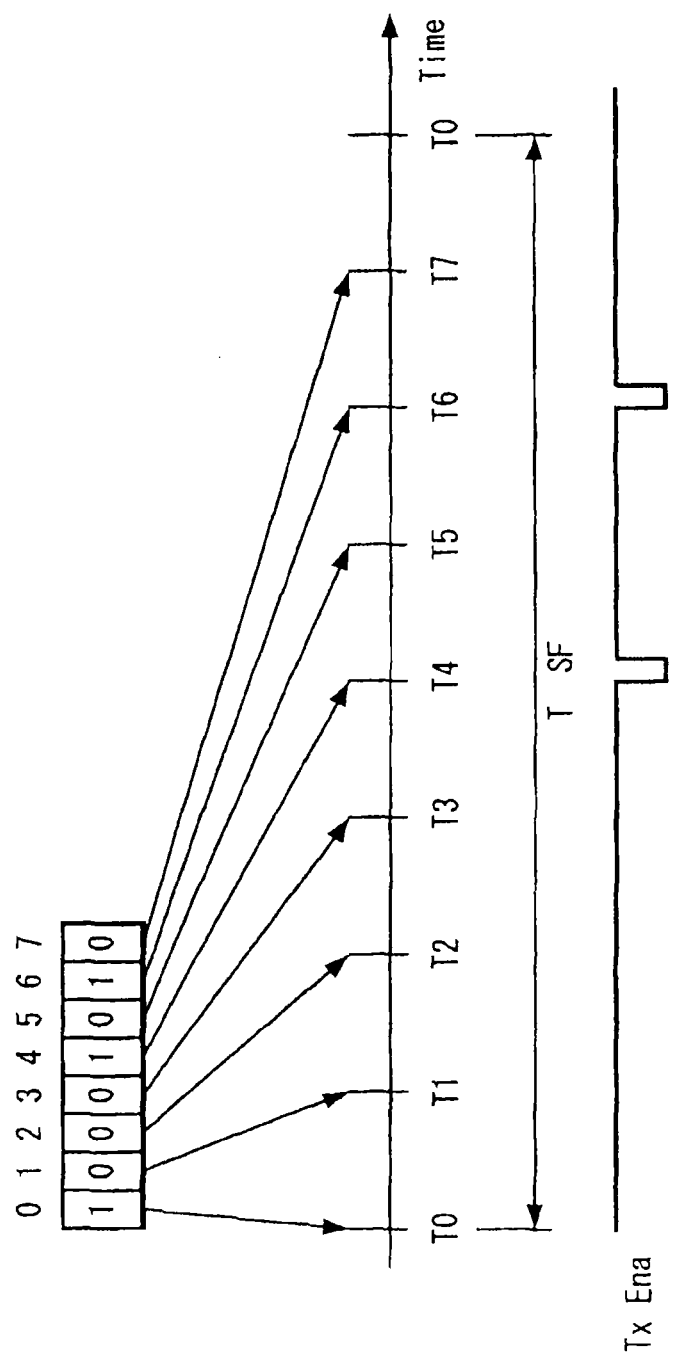
FIG. 7 is an explanatory diagram showing an example of the manner in which a transmission prohibit interval is defined according to an embodiment of the present invention.

FIG. 7 shows the processing executed in that case in which the NBAI field is formed of 8 bits and in which 0th-bit, 4th-bit and 6th-bit are marked after a sum of NBAI fields of respective received beacons was calculated (OR), by way of example. The 0th-bit is the beacon of the local station and hence the addition processing is not carried out. Since the 4th-bit is marked, at the time T4 which is the beacon transmission time of the 4th-bit, the transmission permission flag of the local station is not raised. Also, this applies for the 6th-bit as well and hence at the corresponding time T6, the transmission permission flag of the local station is not raised and the transmission is not carried out. Thus, when a certain communication station wants to receive a beacon from a certain communication station, the transmission station can be prohibited from disturbing this reception and it becomes possible to transmit and receive information with high reliability.

First Example of Beacon Collision Scenario

An example of the manner in which information obtained from the NBOI field is used will be described with reference to FIG. 8. The left-hand sides of FIGS. 8A to 8C show the states in which the communication stations are located, and the right-hand sides thereof show examples in which beacons are transmitted from the respective stations, respectively.

FIG. 8A shows the case in which only a communication station 10 (STA0) exists to transmit a beacon B0. At that time, since the communication station 10 attempts to receive a beacon but failed to receive the beacon, proper beacon transmission timing can be set and transmission of the beacon B0 can be started in response to the arrival of this timing. Here, the beacon is transmitted at the space of 80 [msec]. At that time, all bits of the NBOI field of the beacon transmitted from the communication station 10 are 0.

FIG. 8B shows the case in which a communication station 11 (STA1) joined the communication range of the communication station 10 later on. When the communication station 11 attempts to receive a beacon, it receives the beacon B0 of the communication station 10. Further, since all bits of the NBOI field of the beacon B0 of the communication station 10 are all 0 except the bits indicating the transmission timing of the local station, the beacon transmission timing is set to substantially the center of the beacon space of the communication station 10 in accordance with the above-mentioned step 1. In the NBOI field of a beacon B1 transmitted from the communication station 11, the bit indicative of the transmission timing of the local station and the bit indicative of the reception timing of the beacon from the communication station 10 are set to 1 and other bits are set to 0. Also, when the communication station 10 also becomes aware of the beacon from the communication station 11, it sets the corresponding NBOI field to 1.

Figure 8:
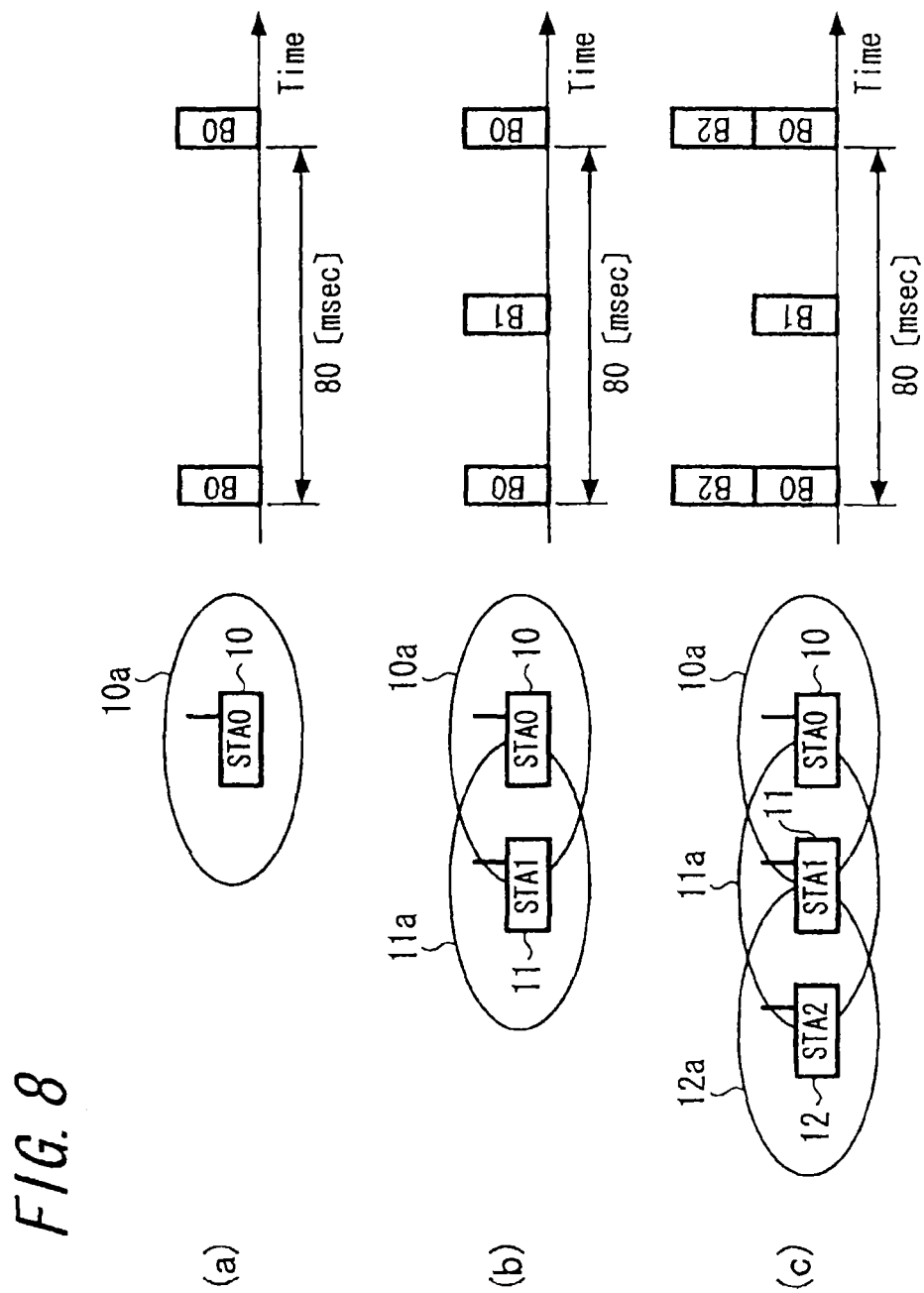
FIG. 8 is an explanatory diagram showing a first example of a beacon collision scenario according to an embodiment of the present invention.

Further, FIG. 8C shows the case in which a communication station 12 (STA2) joined the communication range of the communication station 11 later on. In the example of FIG. 8, the communication station 10 serves as a hidden terminal for the communication station 12. For this reason, since the communication station 12 cannot recognize that the communication station 11 is receiving the beacon from the communication station 10, there is a possibility that this communication station will transmit the beacon at the same timing as that of the communication station 10 so that their beacons will collide with each other. The NBOI field is used to avoid this phenomenon. When the communication station 12 attempts to receive the beacon, it receives the beacon B1 from the communication station 11. Further, in the NBOI field of the beacon B1 from the communication station 11, in addition to the bit indicative of the transmission timing of the local station, 1 is also set to the bit which indicates timing at which the communication station 10 is transmitting the beacon. For this reason, even when the communication station 12 cannot directly receive the beacon B0 transmitted from the communication station 10, it recognizes the timing at which the communication station 10 transmits the beacon B0 and will not transmit the beacon at this timing. Accordingly, at that time, the communication station 12 sets the beacon transmission timing to substantially the middle between the space of the beacon transmitted from the communication station 10 and the space of the beacon transmitted from the communication station 11. Of course, in the NBOI field of the beacon B2 transmitted from the communication station 12, bits indicative of the beacon transmission timings of the communication stations 12 and 11 are set to 1.

The NBOI field in which the beacons are transmitted at the same timing as that of the communication station 10 to cause the beacons to collide with each other is used to avoid this phenomenon. That is, the NBOI field is used to avoid the occurrence of the beacon collision scenario (first example) shown on the right-hand side of FIG. 8C.

As described above, in the wireless communication system according to this embodiment, each communication station transmits the beacon information to other communication station so that other communication station can recognize the existence of the local station and can also recognize the network arrangement. The new communication station, joined to the network, receives the beacon signal so that it can detect that it entered the communication range. At the same time, such new communication station deciphers the information written in the beacon and can transmit the beacon while avoiding its beacon signal from colliding with the existing beacon signal and thereby a new network can be configured.

Second Example of Beacon Collision Scenario

Figure 9:
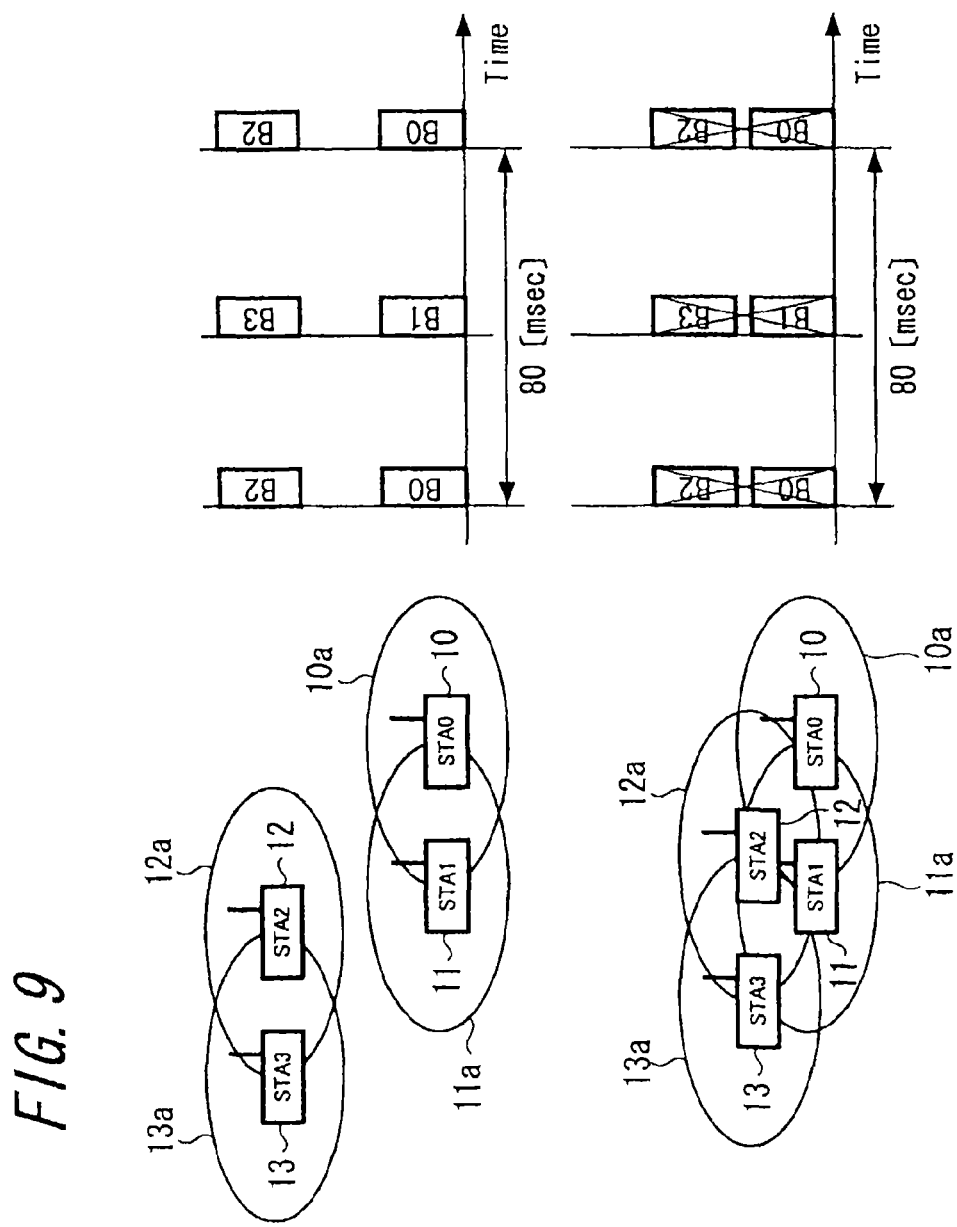
FIG. 9 is an explanatory diagram showing a second example of a beacon collision scenario according to an embodiment of the present invention.

In the case except the above-mentioned first example of the beacon collision scenario, the beacon collision case is assumed. This is assumed to be a second example of a beacon collision scenario and is shown in FIG. 9. The second example is the example in which the systems in which the networks were constructed already approach each other.

As shown in FIG. 9A, the communication station 10 (STA0) and the communication station 11 (STA1) exist in the range in which they cannot receive radio waves from a communication station 12 (STA2) and a communication station 13 (STA3, and the communication station 10 and the communication station 11 communicate with each other. Quite independently of the relationship between the above communication stations, the communication stations 10 and 11 are communicating with each other. Let it be assumed that the beacon transmission timings of the respective stations which are not aware of them at that time unfortunately are overlapping with each other as shown on the right-hand side of FIG. 9A. Also, assuming that the respective stations are moved later and that they become able to transmit and receive information, then there occurs an accident in which the beacons of the respective stations collide with each other as shown in FIG. 9B.

Such collision of the beacons can be avoided by the following processing.

Figures 10, 11:
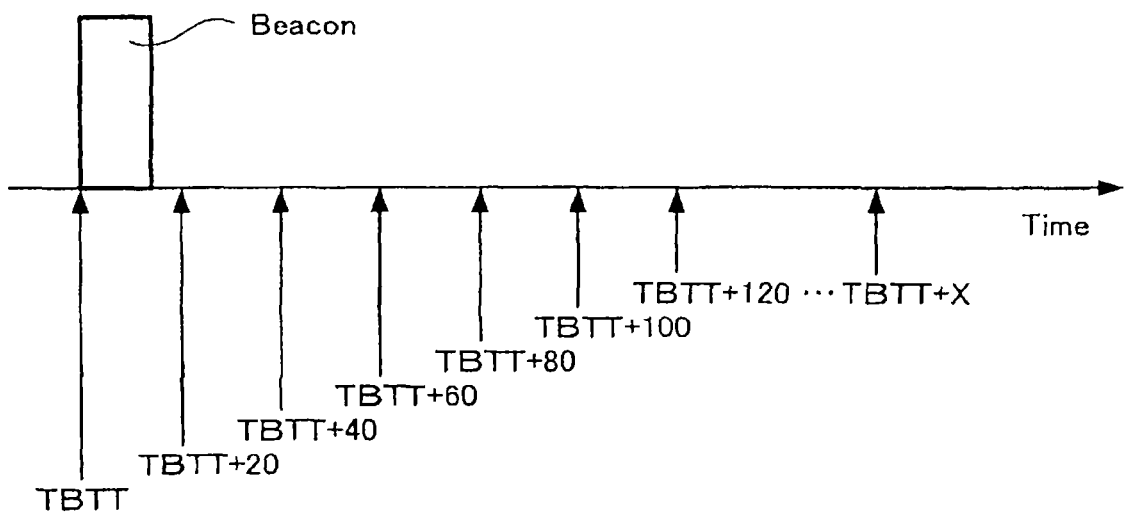
FIG. 10 is an explanatory diagram showing a beacon transmission offset according to an embodiment of the present invention.
FIG. 11 is an explanatory diagram showing part of beacon description information according to an embodiment of the present invention.

TBTT Offset Indicator (Offset Indicator):

FIG. 10 shows the TBTT times and the transmission times at which the beacons are transmitted in actual practice.

The beacon transmission timing is determined at every 80 [msec] in the step 1. The beacon transmission time determined at every 80 [msec] is defined as a TBTT (Target Beacon Transmit Time). In this embodiment, in order to prevent the beacons from colliding with each other continuously in the case like the above-mentioned second example of the beacon collision scenario, the beacon transmission timing is displaced from the TBTT time intentionally. For example, when the TBTT offset is defined such that the actual beacon transmission time is set to any one of TBTT, TBTT+20[μsec], TBTT+40[μsec], TBTT+60[μsec], TBTT+80[μsec], TBTT+100[μsec], TBTT+120[μsec] as shown in FIG. 10, the TBTT offset for transmitting a beacon is determined at every superframe period and a TOISS field (which will be described later on) contained in the beacon is updated. Before a beacon is transmitted, the offset amount from the TBTT may be selected randomly this time.

While the beacon transmission time is defined at the unit of 20 [μsec] step, it is not limited to 20 [μsec] and may be defined by a smaller step. The amount displaced from the TBTT intentionally is referred to as a "TBTT offset".

Figure 15:
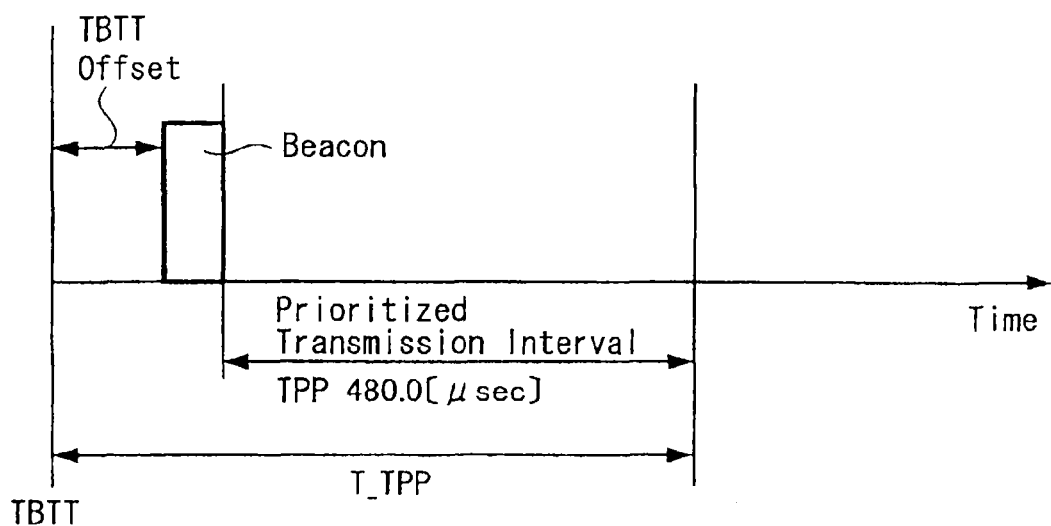
FIG. 15 is an explanatory diagram showing an example of a transmission prioritized interval according to an embodiment of the present invention.

Also, a TBTT Offset Indicator Sequence (TOISS) field shown in FIG. 15 is defined as one of information transmitted by the beacon. In the TOIS field, there is written a beacon transmission offset value indicating that the amount in which the beacon is intentionally displaced from the TBTT this time and transmitted. The example of FIG. 11 shows the case in which there are provided seven stages of the TBTT offset values and the TOIS field is expressed as 3 bits "2^3>=7". When other packet is transmitted in the TBTT field, the beacon should be transmitted after the transmission of the above packet has been ended. It is frequently observed that the beacon will not be transmitted at the time as the transmission station intends to. In this case, a bit indicative of TBTT+X is set as the TOIS field and the fact that this time beacon transmission timing is not the intended time is transmitted to the neighboring station which can receive the beacon.

As described above, since the beacon transmission time is displaced in accordance with the TBTT offset, in the worst cases like "the second example of beacon collision scenario", it is possible to avoid the accident in which the beacon signals collide with each other continuously.

Figure 12:
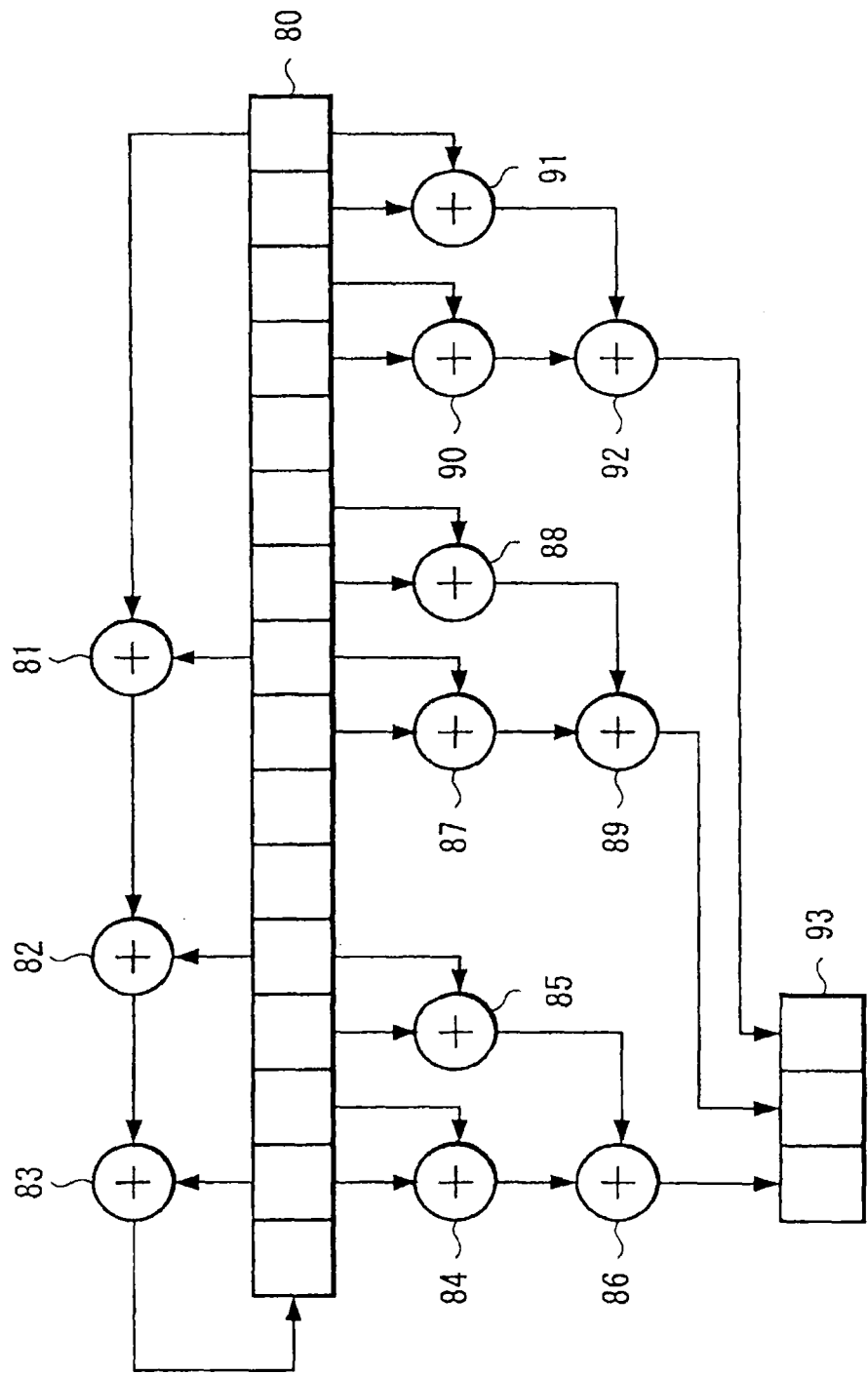
FIG. 12 is a block diagram showing an example of an M-sequence generating circuit according to an embodiment of the present invention.

The TBTT offset can be given by the pseudorandom sequence such as a PN sequence. FIG. 12 is a diagram showing an example of a circuit arrangement in which the TBTT offset is generated by a 16-bit pseudorandom sequence (M sequence) that can be obtained by a simple calculation. A bit string set to a register 80 is updated bit by bit to the value obtained by the addition of adders 81, 82, 83, values are obtained from predetermined positions of the register 80 and added by adders 84 to 92, 3 bits are inputted to a register 93 and the 3 bits are set to the TBTT offset. According to this arrangement, it is possible to effectively avoid the accident in which the beacon signals collide with each other continuously.

While the definition of the TOIS field has been described so far as the information contained in the beacon, instead of the TOIS field, the content (TOI sequence) of the pseudorandom sequence register 80 shown in FIG. 12 will sometimes be transmitted as the information contained in the beacon. When the content of the register 80 is transmitted as the information contained in the beacon, the reception station which received that signal extracts information from the register 93 by the means shown in FIG. 12 and can obtain the TOI information. The TOIS field is calculated each time the station transmits the beacon that is to be transmitted periodically. As a result, the station which received the beacon once becomes able to calculate the TOIS information of the transmission station in a free-running fashion to thereby obtain the next offset and the next offset after the next TBTT offset before it receives the beacon.

Also in this case, when the transmission station could not transmit the beacon at the time as it intends to, the transmission station informs the beacon reception station of the fact that the beacon transmission timing of this time is not the intended time by transmitting all zeroes as the TOI sequence (TOI Sequence).

Beacon Transmission Timing Alteration Request:

In the case of "the second example of beacon collision scenario", there still remains a problem in which beacons will collide with each other once in several times. Accordingly, when each station recognizes that the TBTT fields are set substantially simultaneously at a plurality of stations, it can transmit a TBTT alteration request message to any one of the beacon transmission stations. The communication station which received such message scans the beacon of the neighboring station and sets a time at which the local station did not receive the beacon and at which 1 is not set by the NBOI field of the received beacon as a new TBTT (new TBTT). Before altering the TBTT field in actual practice after the new TBTT field was set, the communication station writes a message of "new TBTT field is set and the TBTT field is altered after XX [msec]" in the beacon that is transmitted from the existing TBTT field and alters the TBTT field.

Countermeasure Against Difference of Clock Frequency:

Next, a mechanism for removing a difference of a clock frequency occurred between the respective communication stations will be described. When the clock frequencies of the respective communication stations are different, drift of transmission and reception timings occurs among the respective stations. If a difference up to ±20 ppm is allowed as an accuracy of a clock frequency, a clock frequency is displaced 3.2 [μsec] at 80 [msec]. If such displacement is left as it is, then there occurs an accident in which the beacon transmission timings overlap with each other. Accordingly, each communication station continuously scans the beacons transmitted from the neighboring station more than once at about 4.0 [sec]. In that time period, it is desired that each communication station should receive over a time period longer than the beacon transmission space of the local station. Then, the communication station matches the beacon transmission timing to the most delayed beacon transmission timing (TBTT) of the communication station. Although the clock frequency is displaced approximately 160 [μsec] during a time period of 4.0 [sec] at maximum, the communication station can make various countermeasures such as to control the timing within the local station after it has obtained displacement information.

In addition to the above-described object, the beacon scan is carried out in order to confirm whether the state (presence) of a peripheral device is changed or not. Specifically, when the communication station receives a beacon from a new communication station during the beacon scan, the communication station transmits the message indicating that the new communication station appears to the high-order layer together with information transmitted by the above beacon. Conversely, when the communication station could not receive the beacon from the communication station of which beacon could be received so far, the communication station stores therein such information. When the communication station could not receive the beacon from the same communication station over a plurality of scanning, it becomes aware that the above communication station has left from the network and it informs the high-order layer of such information. Alternatively, when the communication station could not receive the beacon from the communication station of which beacon could be received son far, it regards that the presence of the neighboring station was changed and it informs the high-order layer of such information successively, whereafter it updates the list (Neighbor List) of the neighboring station.

Figure 13:
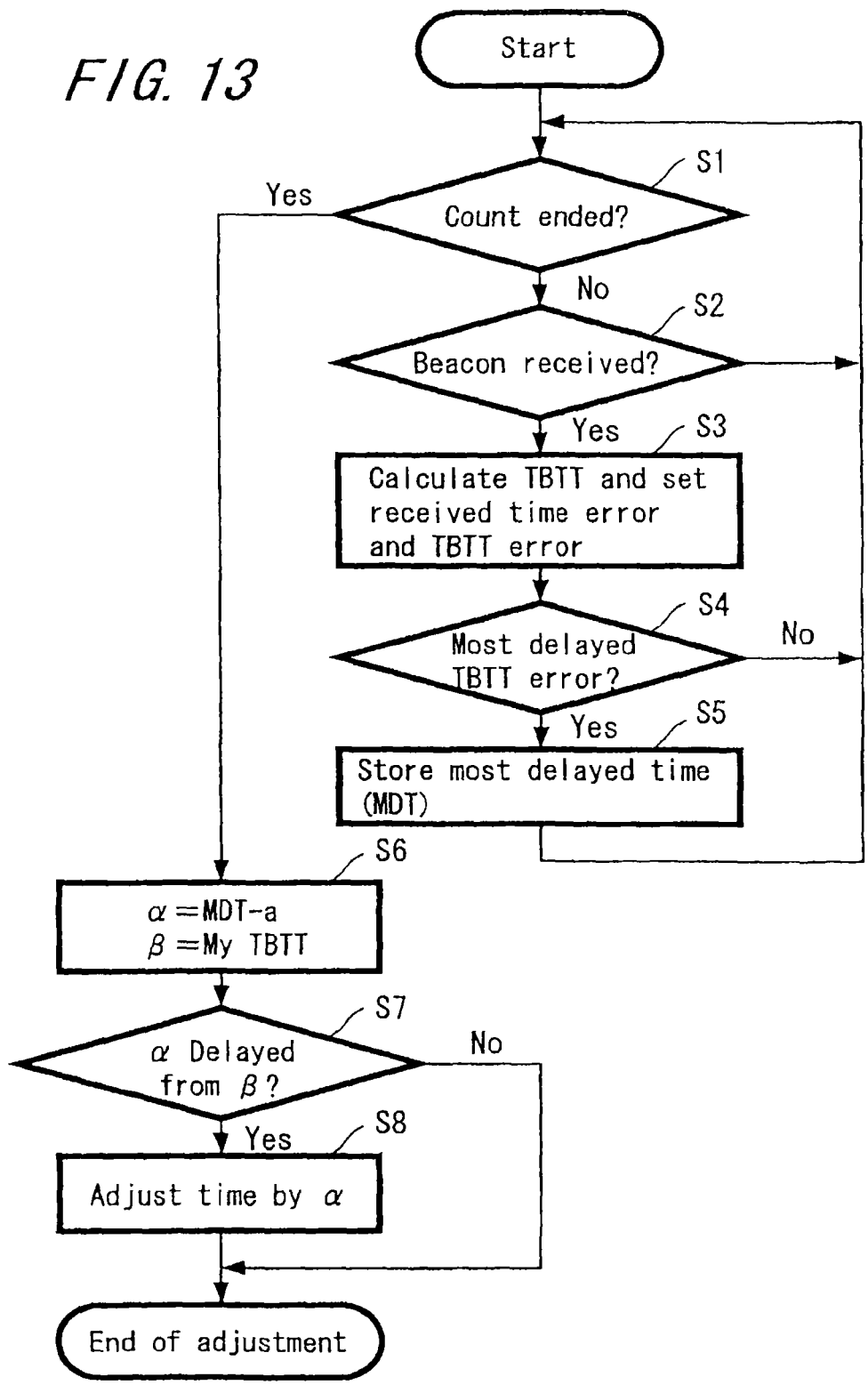
FIG. 13 is a flowchart showing an example of timing control processing according to an embodiment of the present invention.
Figure 14:
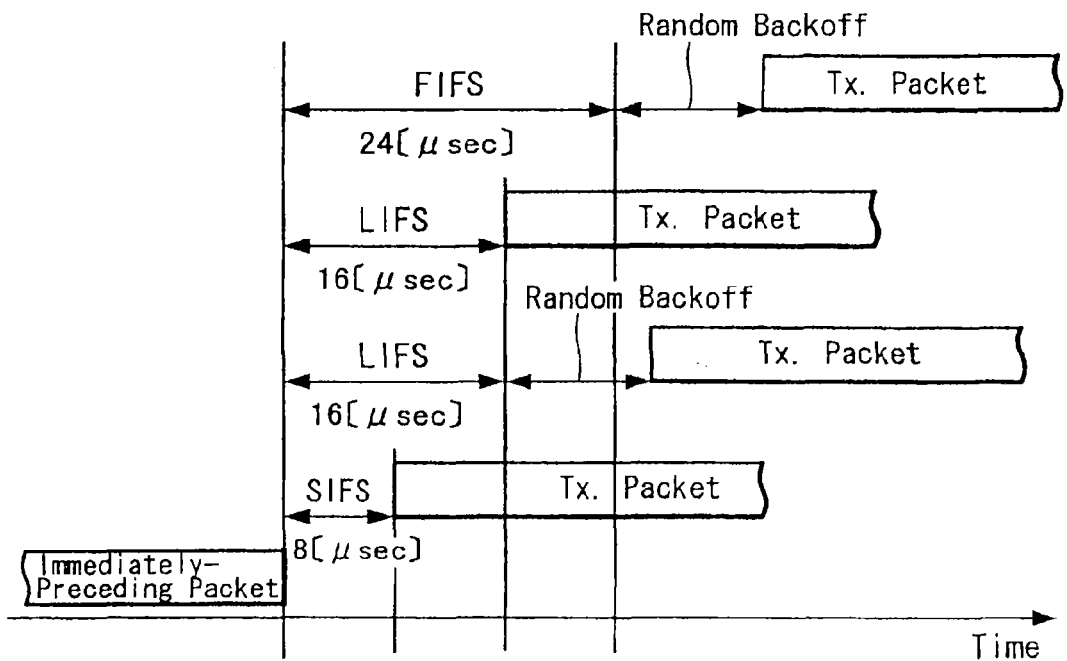
FIG. 14 is an explanatory diagram showing an example of a manner of determining a packet space according to an embodiment of the present invention.

Next, details of an algorithm for countermeasure against difference of clock frequencies will be described with reference to a flowchart of FIG. 13. Clock frequency difference information is obtained by beacon scanning. When beacon scanning (countermeasure processing against difference of clock frequencies) is started, first, a timer is set to start counting 80 [msec] which is the beacon space. Then, it is determined whether or not this count is ended (step S1). When the count is ended, the beacon scanning and information collection required for clock frequency difference countermeasure is ended. The communication station continues to attempt to receive the beacon until the timer is ended. If the beacon is received (step S2), then the communication station compares the TBTT field calculated within the local station and the TBTT field of the received beacon with each other. The communication station can obtain the TBTT field of the received beacon by examining the time at which the beacon is received and the TOIS field. When the TOIS field is set as TBTT+X, that beacon received time is omitted from the total target.

When the TIOS sequence is written in the beacon, all bits are set to 0 as the notation indicating TBTT+X. If the station which received this has the TIOS sequence in which all bits are 0, such beacon received time is omitted from the total target.

The communication station calculates "delayed amount of the TBTT field of the received beacon from the TBTT field calculated within the local station" with respect to the beacon of the total target (step S3). Then, the beacon of which TBTT field is most delayed is judged from all the beacons received until the timer is ended (step S4), and this delayed amount is stored as a most delayed timing (Most Delayed Timing: MDT) (step S5). A value which results from subtracting a previously-set a [μsec] (for example, 2 [μsec]) from the MDT obtained at the time at which the timer is ended is set to α (step 6). Then, it is determined whether or not a is a positive number, that is, the value which results from subtracting a [sec] from the MDT is delayed from the clock frequency of the local station (step S7). If delayed, then the clock frequency of the local station is delayed α (step S8).

According to the above processing, even when the clock frequency of each communication station is displaced, a time is fundamentally adjusted in accordance with the most delayed clock frequency of the communication station existing within the system and hence it is possible to avoid the accident in which transmission and reception timings will drift and overlap with each other. The above-described value a [μsec] is the value that should be set in accordance with the specification required for timing control and may not be limited herein.

The scan space is first set to be a relatively short space of about 1 [sec]. When the above-described clock drift value is extracted, if it is determined that disagreement between the clock frequency of the local station and the clock frequency of the neighboring station is not so remarkable, then it is possible to further suppress the influence caused by the clock drift by using a method for setting a longer space stepwise.

Stop Receiving Beacon of Specific Station:

Although each communication station receives the beacon transmitted from the neighboring station in accordance with the above-described procedure, when it receives from the high-order layer an instruction message of "stop communication with this communication", it does not perform reception operation at the beacon transmission time of the communication station. As a result, it becomes possible to decrease unnecessary reception processing between it and a communication station which is not relating to the local station. Hence, it becomes possible to contribute to decrease of power consumption. The instruction message of "stop communication with this communication station" is judged from attribute of devices of the communication station, it is issued when authentication was not made or it is instructed by users.

Definition of Packet Space (Inter Frame Space):

Similarly to the cases such as the IEEE802.11 system, a plurality of packet spaces is defined also in this example. The definition of this packet space will be described with reference to FIG. 14.

As the packet space, there are defined an SIFS (Short Inter Frame Space) which is a short packet space and an LIFS (Long Inter Frame Space) which is a long packet space. Only a prioritized packet is allowed to be transmitted at the SIFS packet space, and other packets are allowed to be transmitted during the random backoff packet space in which the LIFS+ random value is obtained after it has been determined that the media is clear. To calculate the random-backoff value, there is used a method that is known in the existing technology.

Further, in this embodiment, "LIFS" and "FIFS+backoff" (FIFS: Far Inter Frame Space) are defined in addition to the above-mentioned packet spaces "SIFS" and "LIFS+backoff". Although it is customary to apply the packet spaces of "SIFS" and "LIFS+backoff", in a time zone in which a certain communication station is given a prioritized transmission right, other communication station uses the packet space of "FIFS+ backoff" and the communication station which is given the priority uses the packet space of SIFS or LIFS. The paragraph "time zone in which a certain communication station is given a prioritized transmission right" will be described below.

Figure 16:
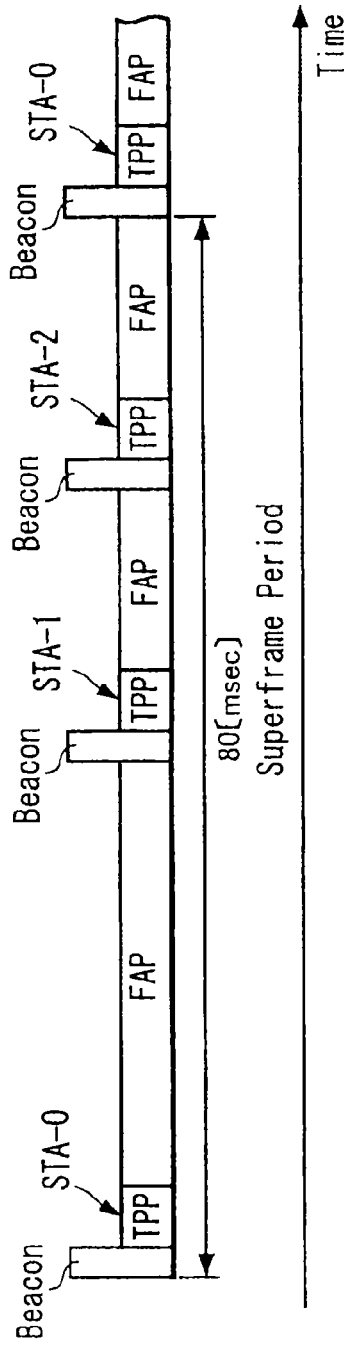
FIG. 16 is an explanatory diagram showing the transmission prioritized interval and a conflict transmission interval according to an embodiment of the present invention.

Transmission Prioritized Interval TPP:

While each communication station is transmitting a beacon at a constant space, according to this embodiment, during a proper time period after the transmission of the beacon, the communication station that has transmitted the beacon is given a prioritized transmission right. FIG. 15 shows an example of the manner in which the beacon transmission station is given a prioritized transmission right. FIG. 16 shows an example in which 480 [μsec] is given as this transmission prioritized interval. This prioritized interval is defined as TPP (Transmission Prioritized Period). The TPP is started immediately after the beacon was transmitted and ended at a time passed from the TBB field by T_ TGP. Since each communication station transmits the beacon at every superframe, the TPP with the same time rate is fundamentally distributed to each communication station. A time period in which other communication station transmits the beacon after the TPP of one communication station elapsed is served as an FAP (Fairly Access Period).

In the FAP (Fairly Access Period), there is carried out a fair media acquisition contention based upon the ordinary CSMA/CA system (or PSMA/CA system which will be described later on).

FIG. 16 shows an arrangement of a superframe. As illustrated, after each communication station has transmitted the beacon, the TPP of the communication station which has transmitted such beacon is assigned, the FAP is assigned after a time corresponding to the duration of the TPP elapsed and the FAP is ended when the next communication station transmits the beacon.

While the TPP is started immediately after the beacon was transmitted by way of example, the present invention is not limited thereto and the start time of the TPP may be set to a relative position (time) from the beacon transmission time. Also, the TPP may be defined in the form of 480 [μsec] from the TBTT field. Further, as shown in FIG. 15, since the TGP area is expired during the period T_ TPP that is based on the TBTT field, when the beacon transmission time is delayed due to the TBTT offset, the TPP area is reduced.

Here, a packet space in each field within the superframe will be described. During the FAP period, all communication stations can transmit the beacons at the "LIFS+backoff" space and hence the access right can be acquired by fair contention control. For example, in order to acquire the access right, the RTS packet and short commands are transmitted at the "LIFS+backoff" space and the CTS packet, data and the Ack packet which are to be transmitted later are transmitted at the "SIFS" space. IFS parameters in the FAP will be shown below.

TABLE

SETTING OF IFS PARAMETER IN FAP

| KIND OF COMMUNICATION STATION | ACCESS WAIT STATE | KIND OF FRAME | TRANSMISSION SPACE | TRIGGER |
| --- | --- | --- | --- | --- |
| ALL COMMUNICATION STATIONS | HAVING TRANSMISSION DATA EXISTS | RTS | LIFS + Backoff | N/A |
| | | COMMAND | LIFS + Backoff | N/A |
| | N/A | CTS | SIFS SPACE | AFTER RTS WAS RECEIVED |
| | HAVING TRANSMISSION DATA EXISTS | DATA | SIFS SPACE | AFTER CTS WAS RECEIVED |
| | DATA RECEIVED | ACK | SIFS SPACE | AFTER DATA WAS RECEIVED |

On the other hand, in the TPP area, the communication station which transmitted the beacon is given the access right and is allowed to transmit the frame after SIFS time passed. Also, the communication station which is designated by the communication station which transmitted the beacon is given a prioritized transmission right and is allowed to transmit the frame after the SIFS time elapsed. When an answer to the CTS packet is not received although the communication station which acquired the prioritized transmission right transmits the RTS packet to a specific communication station, the communication station which acquired the prioritized transmission right transmits again the RTS packet at the LIFS space.

Also, when another communication station that holds data to be transmitted to the communication station which acquired the prioritized transmission right confirms the message "node does not have transmission data", it allows the transmission at the SIFS+backoff (Backoff) frame space. However, it is frequently observed that the third communication station has no means to recognize that the communication station which acquired the prioritized transmission right has data.

The communication station without the prioritized transmission right recognizes by receiving the beacon that other communication station starts the prioritized transmission, it sets the fundamental frame space to the FIFS during the period of T_ TPP and it tries to acquire the access right at the FIFS+backoff frame space.

By the above-described procedure, there is realized a mechanism in which when the communication station which acquired the prioritized transmission right in the TPP area by the above-described procedure has the data which the communication station is to transmit and receive, that communication station is given the access right while when the above communication station does not have the data to be transmitted and received, the access right of the communication station is discarded and other communication station acquires the access right.

The following controls are required depending upon the kinds and states of the respective communication stations.

TABLE

SETTING OF IFS PARAMETER IN TPP

| KIND OF COMMUNICATION STATION | ACCESS WAIT STATE | KIND OF FRAME | TRANSMISSION SPACE | TRIGGER |
|---|---|---|---|---|
| WITH ACCESS RIGHT | SET PRIORITY TRANSMISSION RIGHT | RTS COMMAND | SIFS SPACE | AFTER BEACON WAS TRANSMITTED |
| WITH PRIORITY TRANSMISSION RIGHT | N/A | CTS COMMAND | SIFS SPACE | AFTER RTS WAS RECEIVED |
| WITHOUT PRIORITY TRANSMISSION RIGHT | TRANSMIT BEACON TRANSMISSION DATA TO COMMUNICATION STATION EXISTS | RTS COMMAND | SIFS + Backoff | AFTER COMPLETION OF TRANSMISSION OF PRIORITY TRANSMISSION RIGHT COMMUNICATION STATION |
| | TRANSMIT BEACON TRANSMISSION DATA TO COMMUNICATION STATION DOES NOT EXIST | RTS COMMAND | FIFS + backoff | AFTER COMPLETION OF TRANSMISSION OF PRIORITY TRANSMISSION RIGHT COMMUNICATION STATION |
| ALL COMMUNICATION STATIONS | TRANSMISSION DATA EXISTS | DATA | SIFS SPACE | AFTER CTS WAS RECEIVED |
| | DATA RECEIVED | ACK | SIFS SPACE | AFTER DATA WAS RECEIVED |

With respect to the packet transmission within the TPP of the local station, the communication station is also allowed to transmit the packet at the LIFS space. Further, with respect to the packet transmission within the TPP of other station, other station transmits the packet at the FIFS+backoff space. While the FIFS+backoff is constantly used as the packet space in the IEEE802.11 system, according to the arrangement of this embodiment, this space can be narrowed and hence more effective packet transmission becomes possible.

Also, while each communication station fundamentally transmits one beacon at every superframe period, depending on the cases, it is allowed to transit a plurality of beacons or a signal similar to the beacon, and it can acquire the TPP each time it transmits these beacons. In other words, the communication station can maintain the prioritized transmission resources corresponding to the number of the beacons transmitted at every superframe. Here, the beacon that the communication station constantly transmits at the beginning of the superframe period is referred to as a "regular beacon" and the beacon following the second beacon that is transmitted at other timing in order to acquire the TPP or for other purposes is referred to as an "auxiliary beacon".

Application of Use of TPP:

When the TPP is defined as 480 [μsec], 21 packets corresponding to 60 [Byte] or about one packet of 6000 [Byte] can be transmitted. Specifically, even when the media is crowded, transmission of approximately 21 ACK packets at 80 [msec] can be guaranteed. Alternatively, when only the TPP is used, a transmission line of 600 [kbps]=(6000 [Byte]/80 [msec]) can be maintained at the lowest. While the prioritized transmission right is given to the communication station in the TPP as described above, the prioritized transmission right is given to a communication station which is called by the communication station in the TPP. While transmission takes precedence in the TPP fundamentally, when the communication station does not have any information to be transmitted but it is clear that other station has information that is to be transmitted to the local station, a paging (Paging) message or a polling (Polling) message may be transmitted to such "other station".

Conversely, when the local station has no information to be transmitted although it has transmitted the beacon and the communication station is not aware of the fact that other station has information to be transmitted to the local station, the above communication station does nothing, it discards the transmission priority given thereto by the TPP and it does not transmit any information. Then, after the LIFS+backoff or the FIFS+backoff passed, other station starts transmission even in this time zone.

Having considered the arrangement in which the TPP is followed immediately after the beacon was transmitted as shown in FIG. 16, it is preferable that the beacon transmission timing of each communication station should be equally dispersed within the transmission frame period rather than crowded. Accordingly, in this embodiment, fundamentally, the transmission of the beacon is started at substantially the center of the time zone in which the beacon space is longest within the range in which it can receive the beacon. Of course, there may be used a method in which the beacon transmission timing of each communication station is located intensively and reception operation is stopped during the remaining transmission frame period to decrease power consumption.

Figure 18:
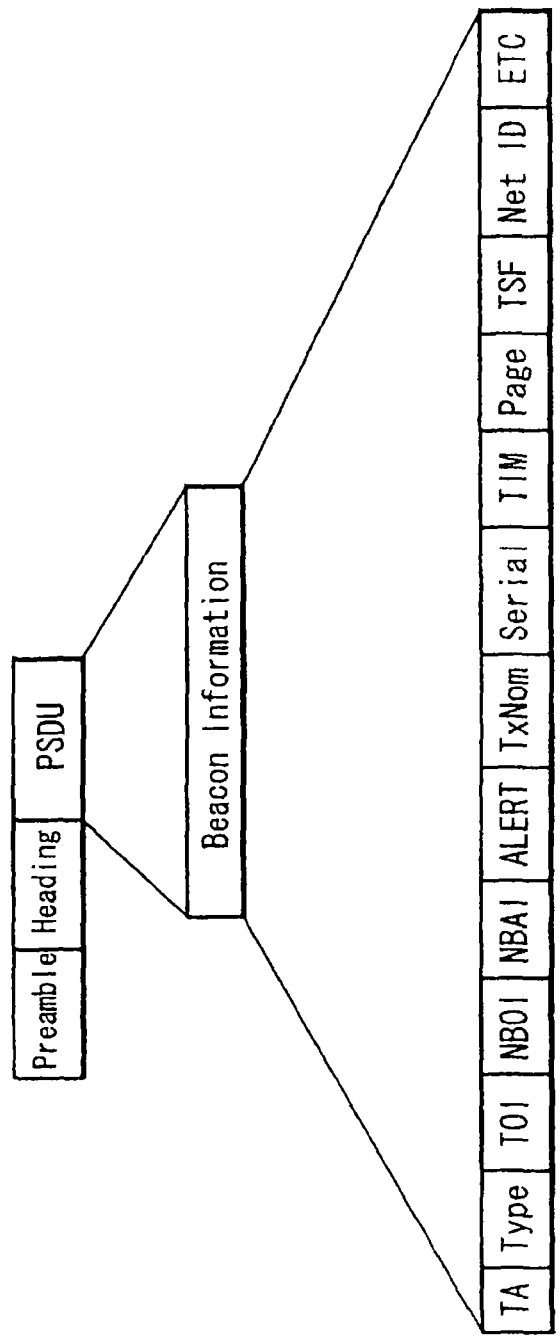
FIG. 18 is an explanatory diagram showing an example of a beacon signal format according to an embodiment of the present invention.

Field of Beacon:

Information described in the beacon transmitted in the decentralized distributed type wireless communication system according to this embodiment will be described. FIG. 18 shows an example of a beacon signal format.

As was already been described with reference to FIG. 17, the preamble indicative of the existence of the packet is added to the beginning of the packet, the heading area in which attribute and length of the packet are described exists next to the preamble and the PSDU is coupled to the heading area. When the beacon is transmitted, information indicating a message in which the packet is the beacon is written in the heading area. Also, information that is transmitted by the beacon is written in the PSDU.

In the illustrated example, the beacon contains a TA (Transmitter Address) field which is an address indicating the transmission station uniquely, a Type field indicative of the kind of the beacon, a TOI field indicative of a TBTT offset value in the superframe period during which the beacon is transmitted, an NBOI (Neighboring Beacon Offset Information) field which is reception time information that can be received from the neighboring station, an NBAI (Neighboring Beacon Activity Information) field which is information indicative of a transmitted time of a beacon signal received by the local station, an ALERT field which stores therein information for altering the TBTT field or other various kinds of information to be transmitted, a TxNum field indicative of an amount in which the communication station maintains resources with a priority, a Serial field indicative of an exclusive unique serial number assigned to the beacon when a plurality of beacons is transmitted during the superframe period, a TIM (Traffic Indication Map) field which is information indicating that the destination station to which information of this communication station is transmitted at present, a Page (Paging) field indicating that the reception station written in the TIM field plans to transmit information in the immediately-following TPP, a Sense Level field for storing therein information indicating the level (reception SINR) of the reception signal that the station detects as the reception signal, a TSF (Timing Synchronization Function) field for reporting time information included in the station and a NetID (Network Identifier) field that is an identifier such as an owner of the station and so on.

The kind of the beacon is described in the Type field in the bit map format of 8-bit length. In this embodiment, information which determines whether the beacon is "regular beacon" that each communication station transmits once at the beginning of the superframe at every superframe or "auxiliary beacon" that is transmitted to acquire the prioritized transmission right is shown by using the values ranging from 0 to 255 which show a priority. To be concrete, 255 which show the maximum priority is assigned to the regular beacon that should be transmitted once at every superframe, and any one of 0 to 255 that corresponds to the priority of the traffic is assigned to the auxiliary beacon.

The pseudorandom sequence that determines the above-mentioned TBTT offset is stored in the TOI field and it indicates the amount of the TBTT offset with which the beacon is transmitted. Since the TBTT offset is provided, even when two communication stations locate the beacon transmission timing at the same slot on the superframe, the actual beacon transmission timing can be displaced. Thus, even when the beacons collide with each other in a certain superframe period, the respective communication stations can listen to thief beacons (or neighbor communication stations can listen to their beacons) in another superframe period, that is, they can recognize the collision of the beacons.

The NBOI field is the information in which the position (reception time) of the beacon of the neighboring station that the local station can receive in the superframe is described. In this embodiment, since one superframe has the slots into which 16 beacons can be located at maximum as shown in FIG. 4, information concerning the layout of the beacons that could be received is described in the bit map format of 16-bit length. That is, the leading bit (MSB) of the NBOI field is mapped with reference to the transmission time of the regular beacon of the local station, the position (reception time) of the beacon that can be received by the local station is mapped on the bit of the relative position from the transmission time of the regular beacon of the local station, 1 is written in the bit corresponding to the relative position (offset) of the regular or auxiliary beacon of the local station and the relative position (offset) of the beacon that can be received and the bit position corresponding to other relative position remains to be 0.

For example, under the communication environment in which 16 communication stations 0 to F at maximum are accommodated as shown in FIG. 4, when the communication station 0 makes the NBOI field such as "1100, 0000, 0100, 0000", this communication station can transmit a message "it is able to receive the beacons from the communication stations 1 to 9". That is, "1" is assigned to the bit corresponding to the relative position of the beacon that can be received when the beacon can be received and "0", that is, space is assigned thereto when the beacon is not received. Also, the reason that the MSB is "1" is that the local station transmits the beacon and hence "1" is assigned to the portion corresponding to the time at which the local station transmits the beacon.

The position (reception time) of the beacon that the local station receives in actual practice is described in the NBAI field at its relative position from the beacon position of the local station by the bit map format. That is, the NBAI field indicates that the local station is set to the active state in which it can receive information Information to be transmitted to the neighboring station is stored in the ALERT field in the abnormal state. For example, when it is planned to change the TBTT field of the regular beacon of the local station in order to avoid the collision of the beacons or when it is requested to stop the neighboring station from transmitting the auxiliary beacon, such message is described in the ALERT field. The manner in which the ALERT field is in actual use will be described later on.

The number of the auxiliary beacons that the station is transmitting within the superframe period is described in the TxNum field. Since the communication station is given the TPP, that is, the prioritized transmission right after the transmission of the beacon, the number of the auxiliary beacons within the superframe period corresponds to a time rate in which the communication station maintains the resources with a priority to transmit information.

A serial number assigned to the beacon when a plurality of beacons is transmitted within the superframe is written in the Serial field. As the serial number of the beacon, an exclusive and unique number is assigned to each beacon that is transmitted within the superframe. In this embodiment, a serial number indicative of the sequential order of the TBTT field in which the auxiliary beacon is transmitted based on the regular beacon of the local station is written in the Serial field.

Report information indicating the destination station to which this communication station has information to be transmitted at present is stored in the TIM field. It is possible for the reception station to recognize that the local station should receive information with reference to the TIM field.

Also, the Paging field is the field indicative of the reception station described in the TIM field to which the communication station intends to transmit information in the immediately-succeeding TPP. The station designated by this field should become ready to receive information in the TPP field, and other field (ETC field) is also prepared.

A TSF field is a field in which time information included in the station is transmitted. This time is used for other uses than the media access and is mainly used to synchronize the applications. The transmission time of the signal that is calculated faithfully, in a free-running fashion, to the clock frequency of the transmission station independently of the access control such as the alteration of the transmission time of the beacon, the correction of the clock frequency to hold the TDMA structure and the TBTT offset is written in this field. The reception station supplies this value to the high-order layer together with the reception time and may hold it as the reference time of the information transmitted from the station.

The NetID field is an identifier indicating the owner of the corresponding station. The reception station can recognize with reference to this field whether or not the local station and the corresponding station belong to the same network logically.

Figure 19:
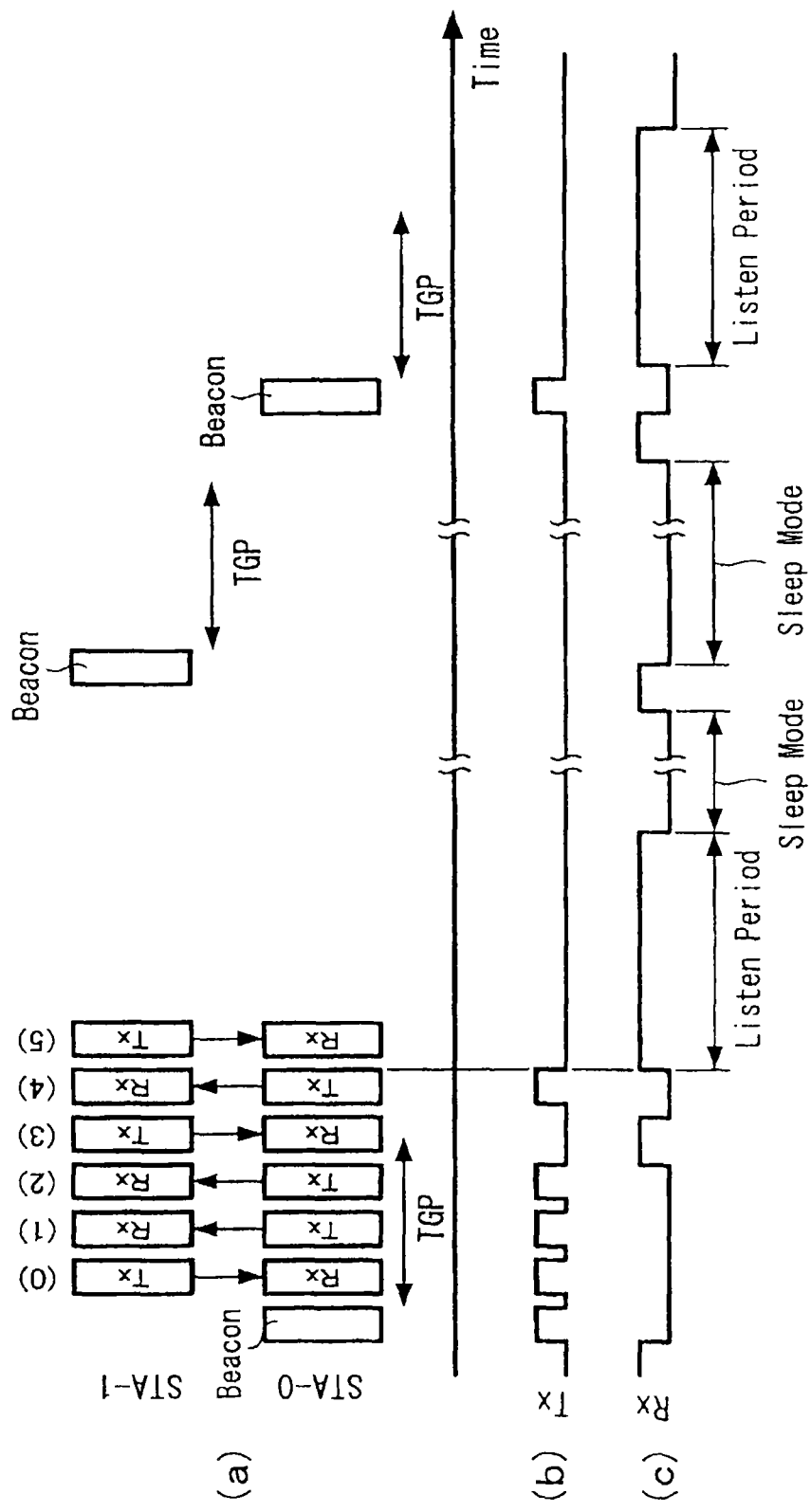
FIG. 19 is a timing chart showing an example (example 1) of the communication state at a communication station according to an embodiment of the present invention.

Procedure of Transmitter and Receiver in the Stationary State No. 1:

A typical example of transmission and reception procedures of a communication station will be described with reference to FIG. 19. FIG. 19 shows a communication station STA0 and a communication station STA1 in the case in which the communication station STA0 transmits information to the communication station STA1. Each communication station does not always receive a beacon signal from other station every time. A frequency at which the communication station receives the beacon signal may be lowered by an instruction from the high-order layer and the like. FIG. 19A shows a sequence diagram of a packet transmitted and received between the communication stations STA0 and STA1, FIG. 19B shows the state of the transmission unit of the communication station STA0, and FIG. 19C shows the state of the reception unit of the communication station STA0. In the state of the transmission and reception unit, the high level state indicates the active state (state in which the transmission and reception unit attempts to receive or transmit information) and the low level state indicates the sleep state.

First, having confirmed that the media is clear, the communication station STA0 transmits a beacon. Let it be assumed that the communication station STA1 is called in the TIM field and (or) PAGE field in this beacon. The communication station STA1 which received the beacon generates a response to paging information (0). Since this response corresponds to the TPP of the communication station STA0, it is given a priority and it is transmitted at the SIFS space. After that, transmission and reception between the communication stations STA1 and STA0 within the TPP is given a priority and hence this response is transmitted at the SIFS space. The communication station which received the response transmits a packet to the communication station STA1 after it has confirmed that the communication station STA1 is placed in the receivable state (1). Further, in FIG. 19, there exists another packet to the communication station STA1, and hence another packet is transmitted (2). The communication station STA1 which received the two packets transmits the ACK packet after it has confirmed that the two packets were received correctly (3). Thereafter, the communication station STA0 transmits the last packet (4). However, during the communication station is receiving the ACK packet, the TPP field of the communication station STA0 is ended and the communication station enters the FAP field when it transmits the last packet (4). Since the communication station does not have the prioritized transmission right in the FAP field and the communication station transmits the last packet (4) at the LIFS+ backoff space. The communication station STA1 transmits the ACK packet corresponding to the last packet (4) (5).

A time period from the last transmission is defined as a "listen period" (Listen Period) in which each communication station is ought to energize the receiver. FIG. 19 also shows this state. When the reception packet does not exist during the listen period, the communication station is changed to the sleep mode and it de-energizes the transmitter and receiver to decrease power consumption. However, when the communication station receives in advance some message indicating "DO NOT WISH TO CHANGE TO SLEEP MODE" from other station or when the communication station receives a similar message from the high-order layer, the communication station is not limited to the above operation but continues to operate the reception unit.

The communication station, which was once placed in the sleep mode, releases the sleep mode in response to a time at which information is transmitted and received next time such as when the communication station receives a beacon from other station or it transmits the beacon of the local station and returned to the active state. In the example of FIG. 19, although the communication station is temporarily returned to the active mode in order to receive the beacon from the communication station STA1, after it was confirmed that the packet to be transmitted to the communication station STA1 does not exist in the TIM field and the PAGE field of the beacon transmitted from the communication station STA1, the communication station is again placed in the sleep mode. After that, before transmitting the beacon of the local station, the communication station energizes the reception unit for sensing the media and after it was confirmed that the media is clear, it transmits the beacon. Although the communication station does not access other communication station in the TIM field and the PAGE field when it transmits the beacon this time, since the communication station STA0 transmits the beacon, the communication station enters the listen period in accordance with the above-described procedure after it has transmitted the beacon and monitors for a while whether or not a signal to the local station is received. When the communication station does not receive any signal and the listen period is ended, it changes its mode to the sleep mode again.

Summary of Example of Transmission and Reception No. 1:

When the communication station transmits the signal, the transmission of the signal is started by the access of the beacon. Having transmitted and received the last packet, the communication station attempts to receive a signal for a while. When the packet does not arrive at the local station, the communication station enters the sleep mode (sleep state). Each time the communication station receives the beacon from other station or transmits the beacon of the local station, it is returned to the active mode (active state). That is, during a stipulated time period after the communication station has transmitted some signal, it energizes the reception unit (communication unit) constantly.

Figure 20:
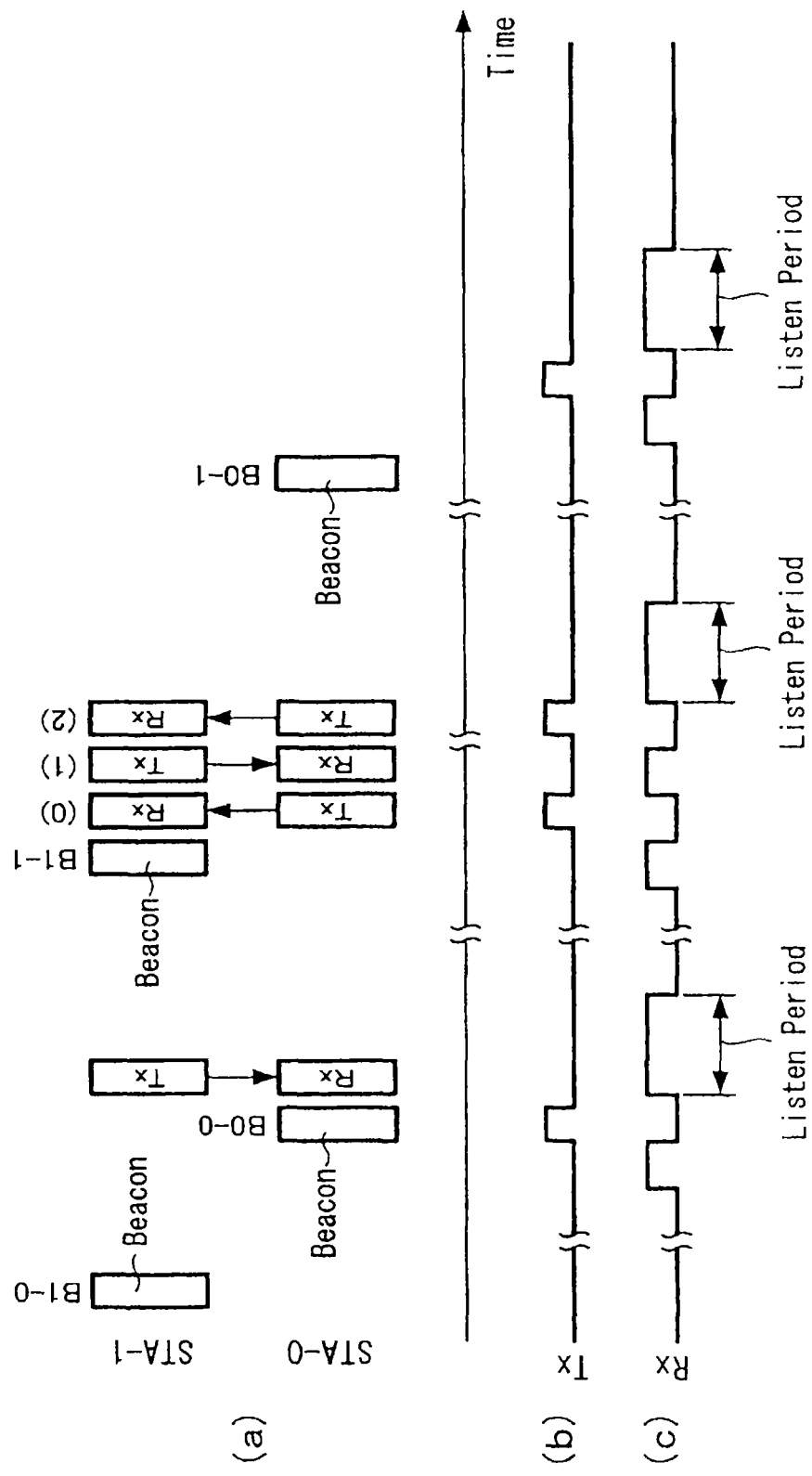
FIG. 20 is a timing chart showing an example (example 2) of the communication state at a communication station according to an embodiment of the present invention.

Procedure of Transmitter and Receiver in the Stationary State No. 2 (Paging Transfer Sequence):

Another typical example of the transmission and reception procedures of the communication station will be described with reference to FIG. 20. Each communication station does not always receive a beacon every time. It is frequently observed that a reception frequency may be lowered by an instruction from the high-order layer and the like. The transmission and reception procedures in this case will be described. FIG. 20 shows the communication stations STA0 and STA1 in which the communication station STA1 transmits a signal to the communication station STA0, by way of example. FIG. 20A shows a sequence diagram of a packet transmitted and received between the communication stations STA0 and STA1, FIG. 20B shows the state of the transmission unit of the communication station STA0, and FIG. 20C shows the state of the reception unit of the communication station STA0. In the state of the transmission and reception unit, the high level state indicates the active state (state in which the communication station is attempting to receive or transmit a signal) and the low level state indicates the sleep mode.

Having confirmed that the media is clear, the communication station STA1 transmits a beacon. At that time, the communication station STA0 is placed in the sleep mode and is not in receipt of the beacon. Accordingly, even when the communication station STA0 is accessed in the TIM field and (or) PAGE field, the communication station STA0 does not respond to such accessing. Thereafter, the communication station STA0 transmits the beacon at the beacon transmission time of the local station. Each time the communication station STA1 receives the beacon from the communication station STA0, it transmits paging information to the communication station STA0 in accordance with the determined random backoff procedure. Having transmitted the beacon, the communication station STA0 is energizing the receiver during the listen period and hence it can receive this paging information. That is, when receiving the paging information, the communication station STA0 can recognize that the communication station STA1 has information for the local station.

At that time point, the communication station STA0 may make a response to the paging information of the communication station STA1 and the communication station STA0 may start transmitting information to the communication station STA1 (although not shown). FIG. 20 shows an example of the case in which the communication station does not yet start transmitting information at that time. After that, at the beacon transmission time of the communication station STA1, the communication station STA0 is caused by the previous paging information to attempt to receive information from the communication station STA1 and it receives the beacon from the communication station STA1. Let it be assumed that the communication station STA0 is accessed in the TIM field and (or) PAGE field in the beacon. Then, the communication station STA0 which received this beacon makes a response to the paging information (0). This response corresponds to the TPP of the communication station STA1 and the communication station is given the prioritized transmission right and it transmits information at the SIFS space. After that, the transmission and reception between the communication stations STA1 and STA0 within the TPP field is given the prioritized transmission right and hence information is transmitted at the SIFS space. When the communication station STA1 which received the response recognizes that the communication station STA0 is placed in the receivable state, it transmits the packet to the communication station STA0 (1). The communication station STA0 which received this packet recognizes that the packet was received correctly and transmits the ACK packet (2). Thereafter, the communication station STA0 energizes the receiver during the listen period to confirm that the packet to the local station is not received, and it changes its state to the sleep mode.

While the packet is transmitted to the beacon transmission station each time the communication station starts receiving the beacon on the assumption that the receiver is being operated during the listen period as described above, the present invention is not limited thereto. When media sense is performed before the beacon transmission time, it is clear that the receiver is being operated before the beacon transmission time. Thus, even when transmission processing is executed at this time zone, similar effects can be achieved.

Summary of Example of the Above Transmission and Reception Procedure No. 2:

When a signal is transmitted, paging information is transmitted immediately after the beacon has been transmitted from the reception side, whereby the reception side is changed into the active state to start transmission and reception processing. Alternatively, the transmission and reception processing is started in response to the access by the beacon from the transmission side. Then, after the last packet was transmitted and received, the reception unit attempts to receive information for a while. If the packet to the local station does not arrive at the communication station, the communication station is placed in the sleep move and each time it receives the beacon from other station or it transmits the beacon of the local station, the communication station is returned to the active mode. That is, the communication station transmits paging information during the listen period of the reception side or in the media sense interval prior to the transmission of the beacon.

Although the message transmitted immediately before/immediately after the reception side transmits the beacon in the above-described reception procedure 2 is not limited to the paging information, since there is a possibility that contention of access of messages from a plurality of stations will occur, it is desired that only a message with a large emergency such as paging information and a beacon transmission timing alteration request should be transmitted.

While the present invention has been described in the form in which the RTS/CTS procedure executed prior to the transmission of the packet for simplicity of description as described above, according to the necessity, the RTS packet and the CTS packet may be exchanged before the packet is transmitted. In that case, it is needless to say that the paging information in the beacon corresponds to the RTS packet and the page response corresponds to the CTS packet.

Also, while the paging information and negotiation processing of its response are executed between the communication stations before transmission of data is started in the above-mentioned example, the present invention is not limited thereto and the source communication station which holds data to be transmitted to a certain communication station may start transmitting data without negotiation processing within the listen period of the reception communication station or an active timing in which such communication station is performing the reception operation (Active Transfer sequence). In this case, processing for establishing connection can be omitted and communication becomes highly efficient.

Application of Process for Determining Beacon Transmission Timing:

The beacon transmission timing will be described. First, the beacon transmission timing will be described with reference to FIGS. 21 and 22.

Figure 21:
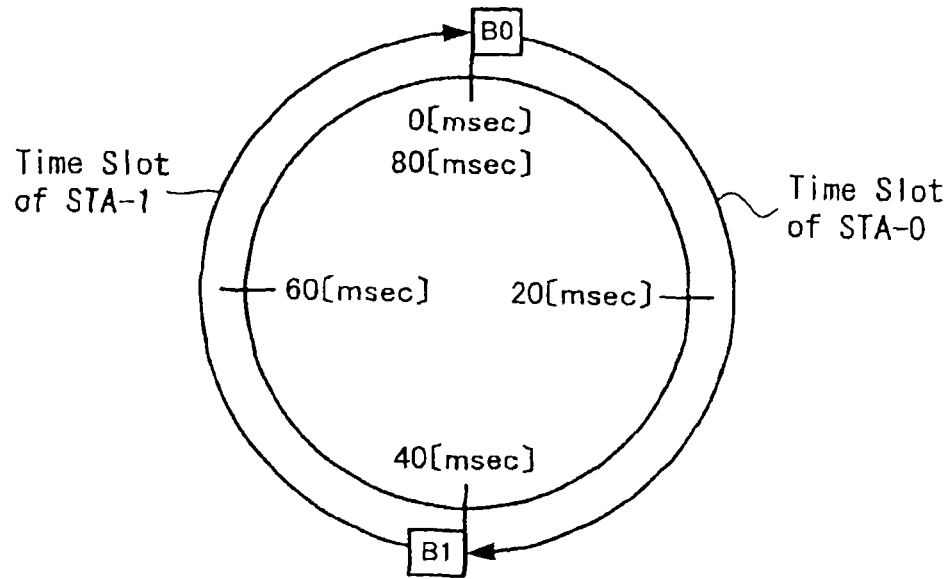
FIG. 21 is an explanatory diagram showing an example of a manner of distributing a time-axis resource according to an embodiment of the present invention.

For example, let it be assumed that two communication stations of communication stations STA-0 and STA-1 exist within the beacon radio wave reaching range. In this case, beacons B0, B1 are located substantially alternately and they are located at a timing relationship of approximately 40 [msec] space as shown in FIG. 21. When an amount of transmission data of the communication stations STA-0 and STA-1 is not so large, the communication station STA-0 starts transmitting the transmission signal in response to the start of the transmission of the beacon from the communication station STA-0 and the transmission is ended after a while. The transmission signal from the communication station STA-1 is similar and if the transmission information amount is ended in a time period shorter than the space of beacons, then it is expected that the transmission requests from the communication stations STA-0 and STA-1 will not collide with each other.

Figure 22:
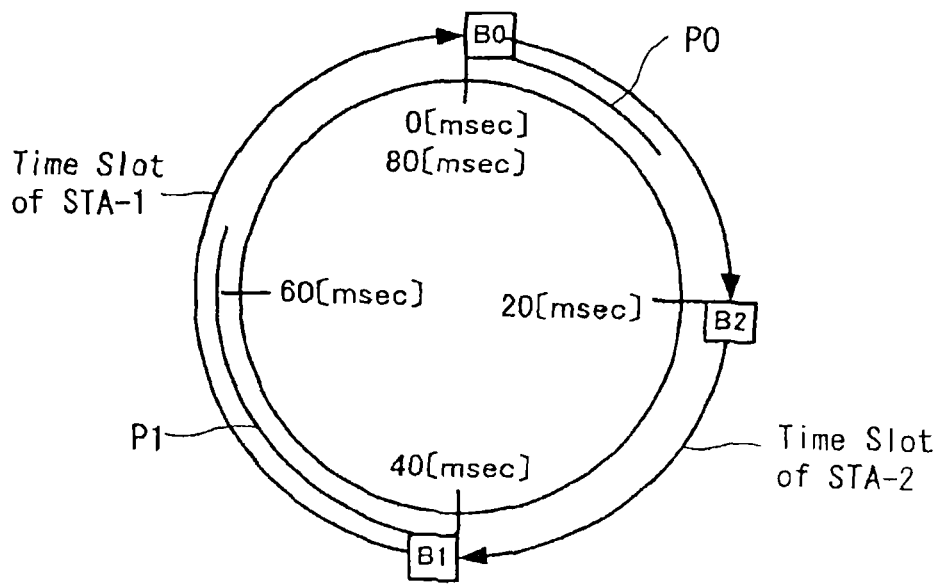
FIG. 22 is an explanatory diagram showing an example of information which is used to determine beacon transmission timing according to an embodiment of the present invention.

FIG. 22 shows the case in which three communication stations exist within the beacon radio wave reaching range similarly.

Here, we assume the case in which a new communication station STA-2 joins this beacon radio wave reaching range. The beacon transmission timing of the communication station STA-2 may be either 20 [msec] or 60 [msec] shown in the sheet of drawing. However, the communication station STA-2 scans the media state before it determines the beacon transmission timing. When traffics are packet transmission P0 that follows the beacon B0 and packet transmission P1 that follows the beacon B1 shown in FIG. 22, if the communication station STA-2 transmits a beacon B2 at a timing of 20 [msec], then collisions of the beacons will be decreased. From this standpoint, it becomes possible for the communication station STA-2 to determine the beacon transmission time in consideration of the occupied state of the media, that is, the traffic amount of each communication state. This is especially effective for the case in which transmission activity becomes different considerably depending upon the communication station.

Band Reservation for Transmitting Stream Data:

Further, let us consider the case in which a communication station which transmits stream data of wide band exists within the system. The communication station intends to continuously transmit a signal of a constant band without collision. In this case, the transmission station increases a beacon transmission frequency within the superframe period. An example of this case will be described with reference to FIG. 23.

It is customary that the superframe period in the channel is defined by the beacon space. In this embodiment, the beacons following the second beacon in one superframe period is transmitted mainly in order to obtain transmission and reception intervals and hence they are different from the original beacons that are transmitted to configure the network from a nature standpoint. In this specification, the beacons following the second beacon in one superframe period are referred to as "auxiliary beacons".

On the other hand, a minimum beacon space Bmin is stipulated in order to prevent the band (superframe period) from being filled with beacons and there is an upper limit on the number of communication stations that can be accommodated within the superframer period (mentioned hereinbefore). For this reason, when a new communication station joins the network, the auxiliary beacon has to be released in order to accommodate this new communication station in the superframe period.

Figure 23:
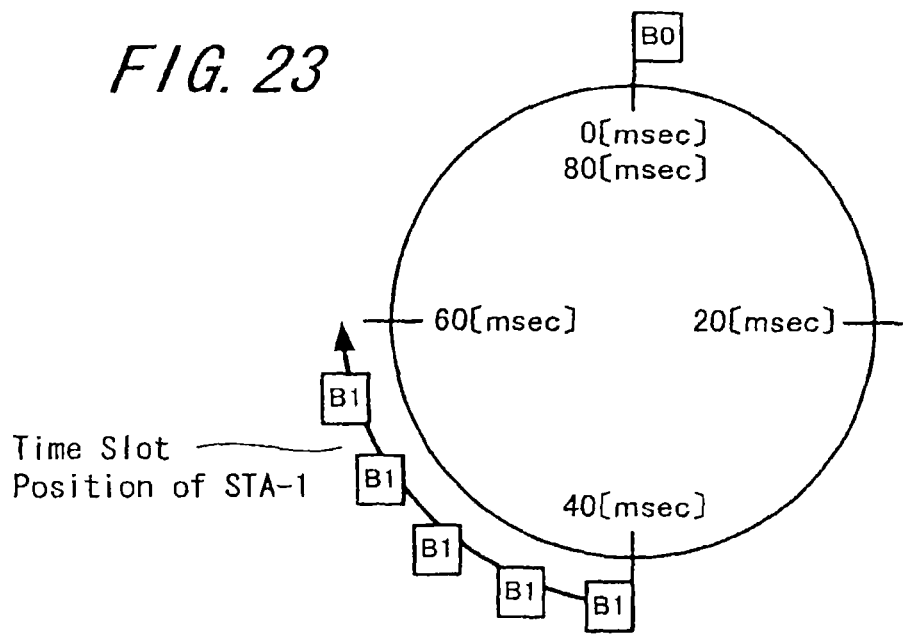
FIG. 23 is an explanatory diagram showing an example of band reserve processing according to an embodiment of the present invention.

While FIG. 23 shows the case in which the beacons B1 and B1' are transmitted continuously, the present invention is not limited thereto. When the communication station transmits the beacon, the beacon is immediately followed by the TPP field and it becomes possible to acquire the media without access acquisition contention. A communication station which strongly requires the right of possessing the media can get much more transmission rights by increasing the frequency at which the beacon is transmitted.

Also, the "auxiliary beacon" need not always describe thereon beacon information. In order to decrease the overhead in which the beacons are transmitted a plurality of times, a packet category called a "false beacon for accommodating traffic" may be defined in which a flag of a message indicating that attribute of a packet is a kind of a beacon may be raised and traffic may be transmitted as the contents.

For example, in a certain system, when the capacity reaches substantially its limit and quality of services that the network is providing at present cannot be guaranteed if much more traffic is accommodated, each communication station transmits as much beacons as possible. Thus, even when a new communication station joins the network, the beacon transmission timing cannot be given to such new communication station and the accommodation of the new communication station into this area can be refused.

Figure 24:
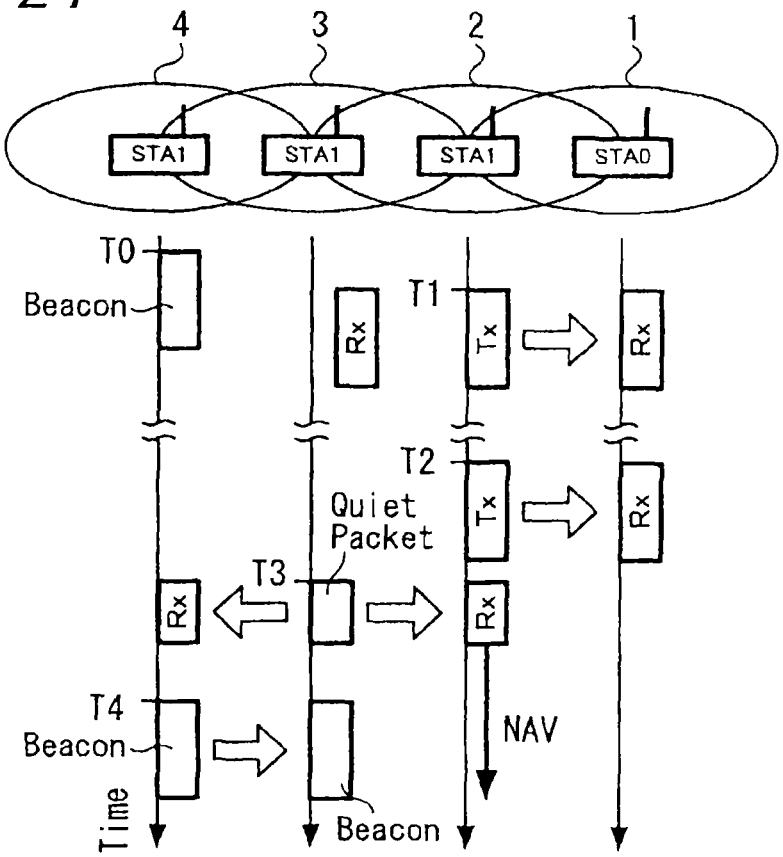
FIG. 24 is an explanatory diagram showing an example of the manner in which a quiet packet is used according to an embodiment of the present invention.

Example of Use of Quiet (Quiet) Packet:

While each station transmits a beacon periodically, since the traffic packet is transmitted in accordance with the CSMA (or PSMA) procedure, an accident will be caused by the transmission of the traffic packet from other station in which the beacon cannot be received. FIG. 24 shows an example of this case.

In FIG. 24, it is assumed that, when communication stations STA1, STA2, STA3, STA4 exist, the communication station STA2 transmits information to the communication station STA1, the communication station STA3 exists in the area in which the transmission signal from the communication station STA2 can be received, the communication station STA3 intends to receive the beacon transmitted from the communication station STA4 and that the communication station STA2 exists in the area in which it cannot receive the beacon from the communication station STA4. In this example, at a time T0, the communication station STA4 transmits the beacon and the communication station STA3 starts receiving this transmitted beacon. However, since the communication station STA2 cannot receive the signal from the communication station STA4, this communication station starts transmitting information to the communication station STA1 at a time T1 in accordance with the random backoff procedure. The transmitted signal from this communication station STA2 interferes with the communication station STA3 so that this communication station becomes unable to receive the beacon from the communication station STA4.

Figure 25:
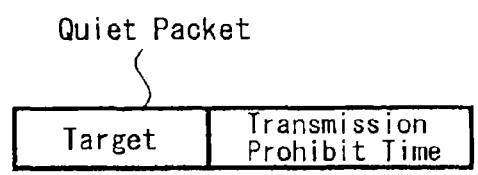
FIG. 25 is an explanatory diagram showing an example of an arrangement of a quiet packet according to an embodiment of the present invention.

A quiet (Quiet) packet is used in order to avoid this accident. The quiet packet is a packet which transmits a message "This station will receive information from other station and wishes other station not to transmit a signal" to the neighboring stations. As shown in FIG. 25, the quiet packet describes thereon "target station of which information will be received by quiet packet transmission station (target)" and "transmission prohibit time".

In the example of FIG. 24, the communication station STA3 transmits the quiet packet at the time T3 before a time T4 which is the next TBTT field of the communication station STA4. When the communication station STA2 which received the quiet packet recognizes that the local station is not the target station of the quiet packet, it stops transmitting information until the time instructed by the quiet packet. On the other hand, although the quiet packet reaches the communication station STA4, when the communication station STA4 recognizes that the local station is the target station of the quiet packet, it neglect the quiet packet and transmits the beacon at the time T4 that is the TBTT field as it is planned to do. Thus, the communication station STA3 becomes able to receive the beacon without being disturbed by the communication station STA2.

Example of Operation of Media Scan Method (PSMA: Preamble Sense Multiple Access):

This embodiment uses the CSMA procedure as the access method and hence the fundamental method is to transmit information after it has confirmed the communication state. However, in the specification of the physical layer of the baseband unit of the communication station, such a case is considered in which information such as a reception electric field intensity (RSSI) cannot be used as media occupied information. For example, this case may be a communication system such as an ultra-wide band communication for making communication by using a wide band ranging from 30 GHz to 10 GHz. In such case, the existence of the packet can be recognized only by receiving the preamble of the unique word added to the leading portion of the packet. That is, this media scan method is collision avoidance control based upon the detection of the preamble and the transmission station transmits information after it has confirmed that the media state is clear. This is defined as "PSMA". For this reason, even when the transmission station which intends to transmit information after it has changed from the sleep mode transmits any information, it starts media reception processing before a time of a predetermined time (MDI: Maximum Data Interval: maximum data interval (that is, maximum packet length)). When the above communication station detects the preamble of the packet transmitted from other communication station during this time period, it refrains from transmitting information.

Figure 26:
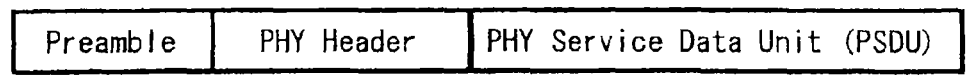
FIG. 26 is an explanatory diagram showing an example of an arrangement of a PHY frame according to an embodiment of the present invention.

Since the communication station performs access control by detecting the preamble, the preamble is constantly added to the PHY frame. FIG. 26 shows a PHY frame format stipulated by a PHY layer (physical layer). The preamble added to the beginning of the PHY frame is composed of the known unique word.

Figure 27:
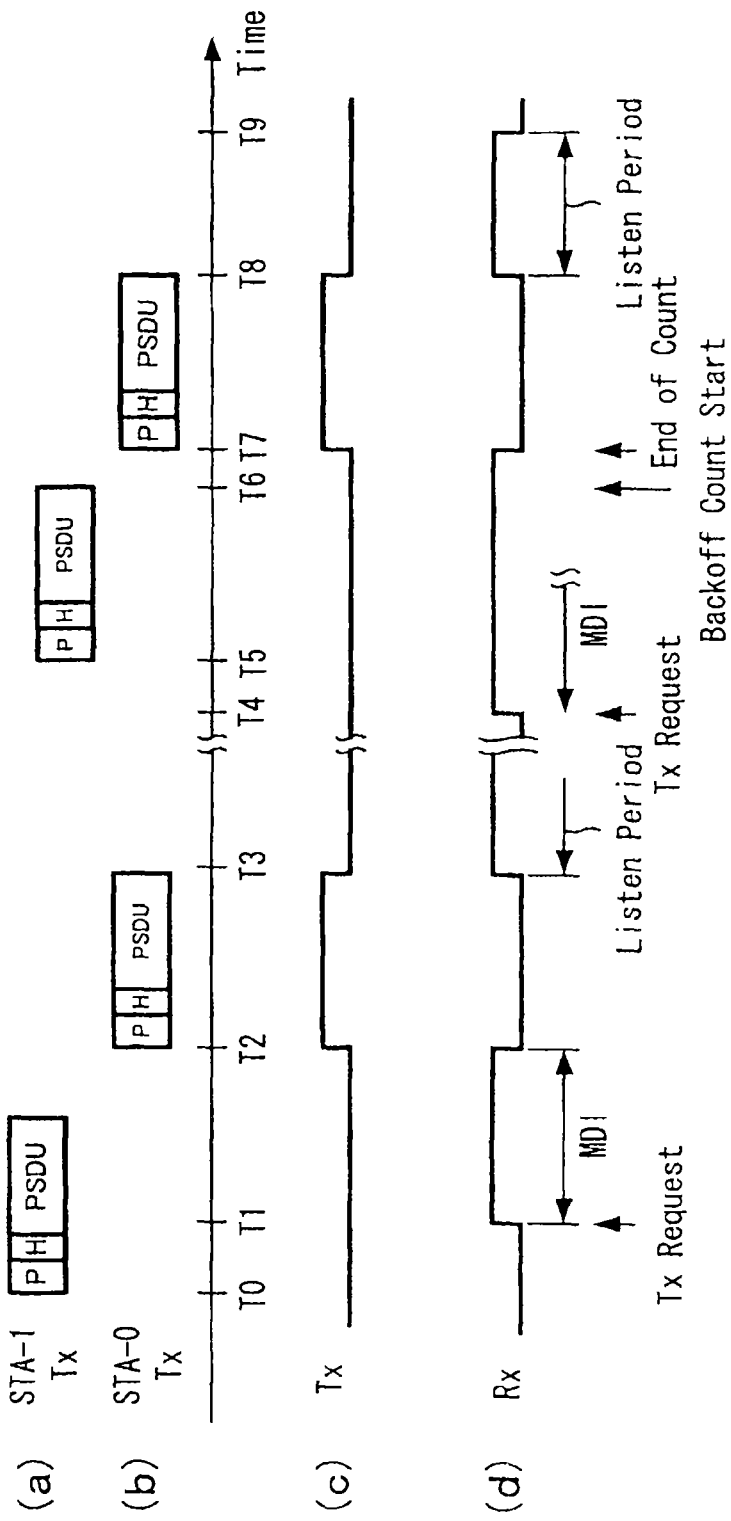
FIG. 27 is an explanatory diagram showing an example (example 1) of media scan according to an embodiment of the present invention.

The communication station which receives information and the communication station which transmits information can recognize by detecting the preamble that the media is occupied. This state will be described with reference to FIG. 27. FIG. 27 is a diagram used to explain the case in which the communication stations STA0 and STA1 transmit information. FIG. 27A shows a transmission sequence of the communication station STA1, and FIG. 27B shows a transmission sequence of the communication station STA0.

Then, FIGS. 27C, 27D show the states of the transmission unit and the reception unit of the communication station STA0 (high level: active mode, low level: sleep mode).

At a time T1, the communication station STA1 starts transmitting a packet. Since the communication station STA0 is in the sleep mode at that time point, it is unable to recognize that the communication station STA1 has transmitted the packet. Thereafter, let it be assumed that the high-order layer informs of the communication station that the communication station STA0 has information to be transmitted at the time T1 (Tx request). Although the random backoff procedure is started at this time point according to the conventional IEEE802.11 system wireless LAN, since the communication station starts receiving information from the time T1, it cannot receive the preamble of the unique word and hence it cannot recognize that the media is being used by the communication station STA1. Therefore, there is then a possibility that the transmission of information from the communication station STA0 will interfere with the packet of the communication station STA1. Accordingly, when the communication station STA0 is placed in the active mode at the time T1, from this time point, it confirms during the maximum data space MDI (Max. Uniqueword Interval) that the media is clear. A time T2 is a time point that passed from the time T1 by MDI. The communication station STA0 energizes the receiver from the time T1 to the time T2 and starts transmitting information only when it does not detect the unique word (preamble of FIG. 25) of the packet.

Let it be assumed that the high-order layer reports information to the communication station (Tx request). Since the communication station STA0 is set to the sleep mode immediately before the time T4, the communication station starts confirming during the time period from the time T4 to the MDI that the media is clear. Then, since the packet is transmitted from the communication station STA1 at a time T5 this time, the communication station STA0 detects the unique word to recognize the existence of this packet. The communication station STA0 starts the random backoff procedure from a time T6 at which the transmission of this packet is ended. If the communication station does not detect the unique word until a time T7 at which the timer is de-energized, then it transmits the packet at the time T7.

Figure 28:
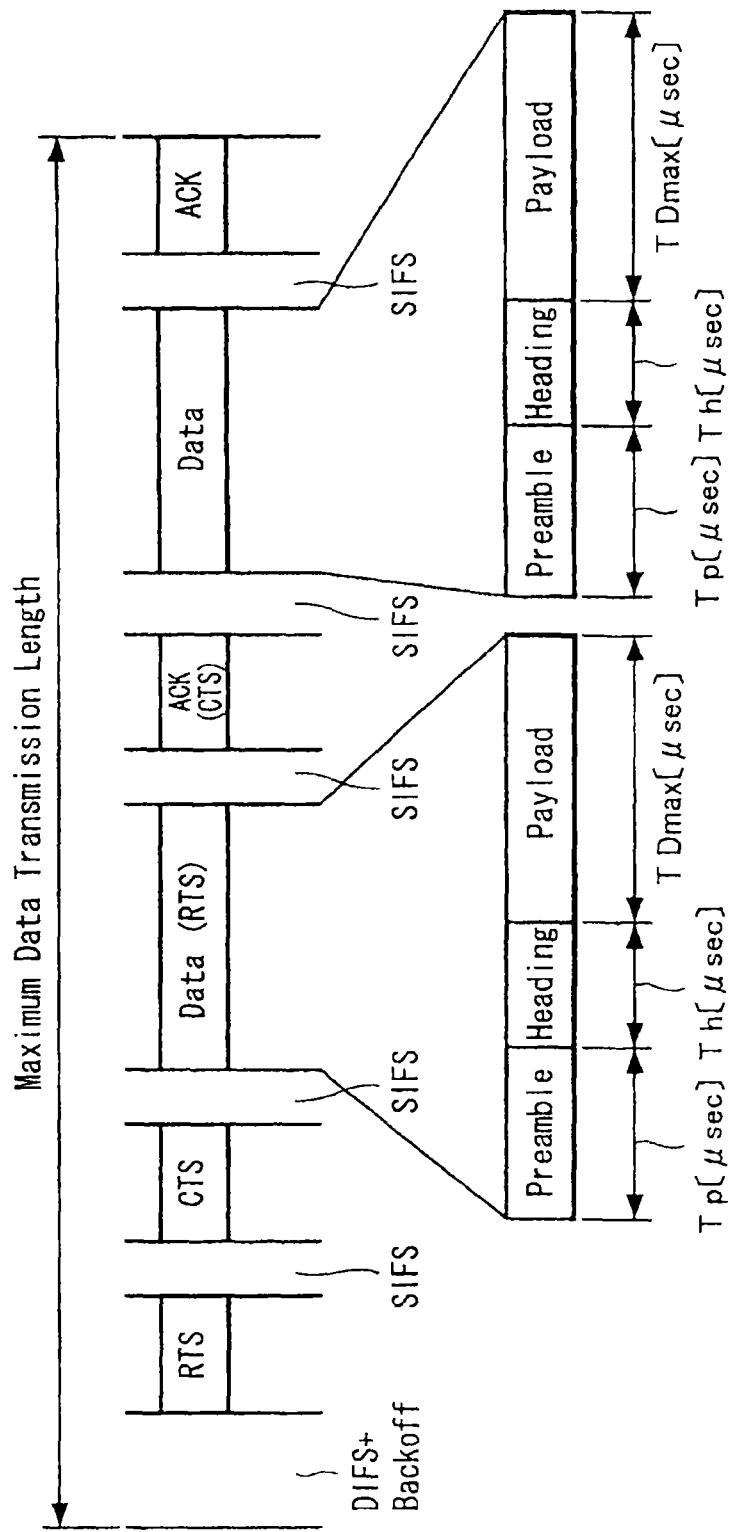
FIG. 28 is an explanatory diagram showing an example of the manner in which data is transmitted a plurality of times according to an embodiment of the present invention.

While the present invention has been described so far on the assumption that the MDI is equal to the maximum packet length, when the communication station intends to transmit a large amount of data that cannot be transmitted by one packet, data transfer over a long period of time may be allowed by acquiring the access right once as shown in FIG. 28. As shown in FIG. 28, within the range of the maximum data transmission length obtained when the access right is acquired once, the data packet containing the payload may be repeatedly transmitted, whereby a large amount of data may be transmitted.

Figure 29:
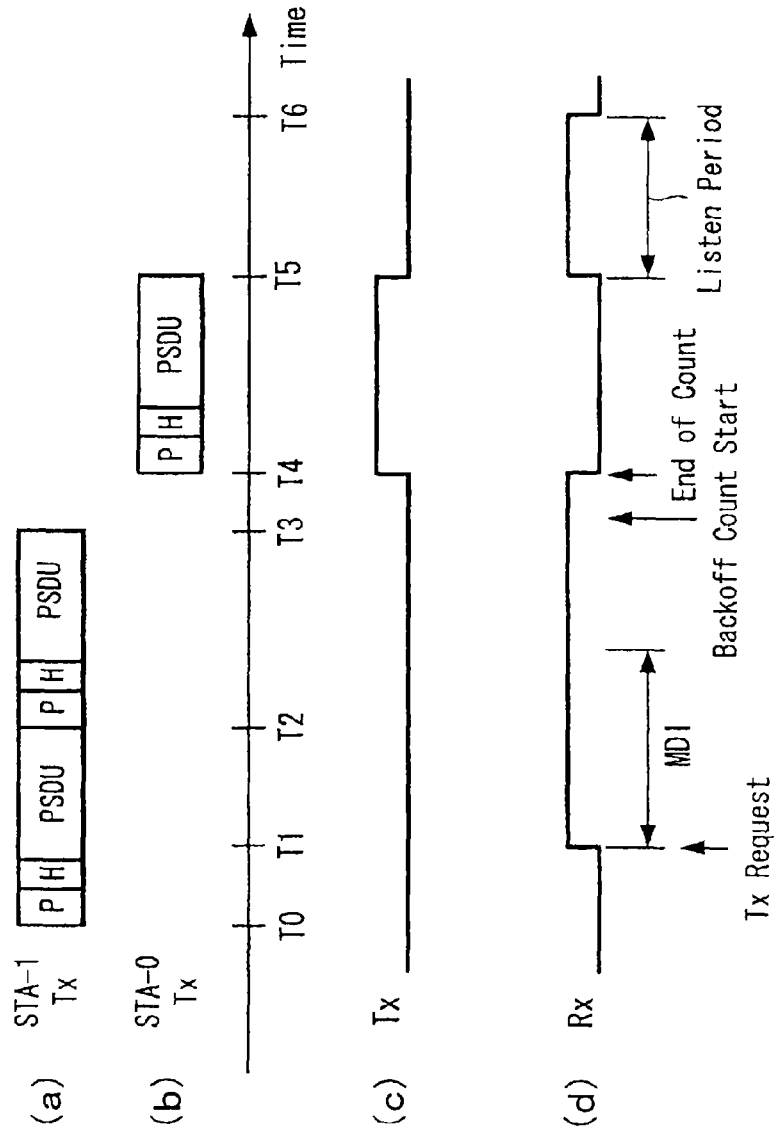
FIG. 29 is an explanatory diagram showing an example (example 2) of media scan according to an embodiment of the present invention.
Figures 30, 31:
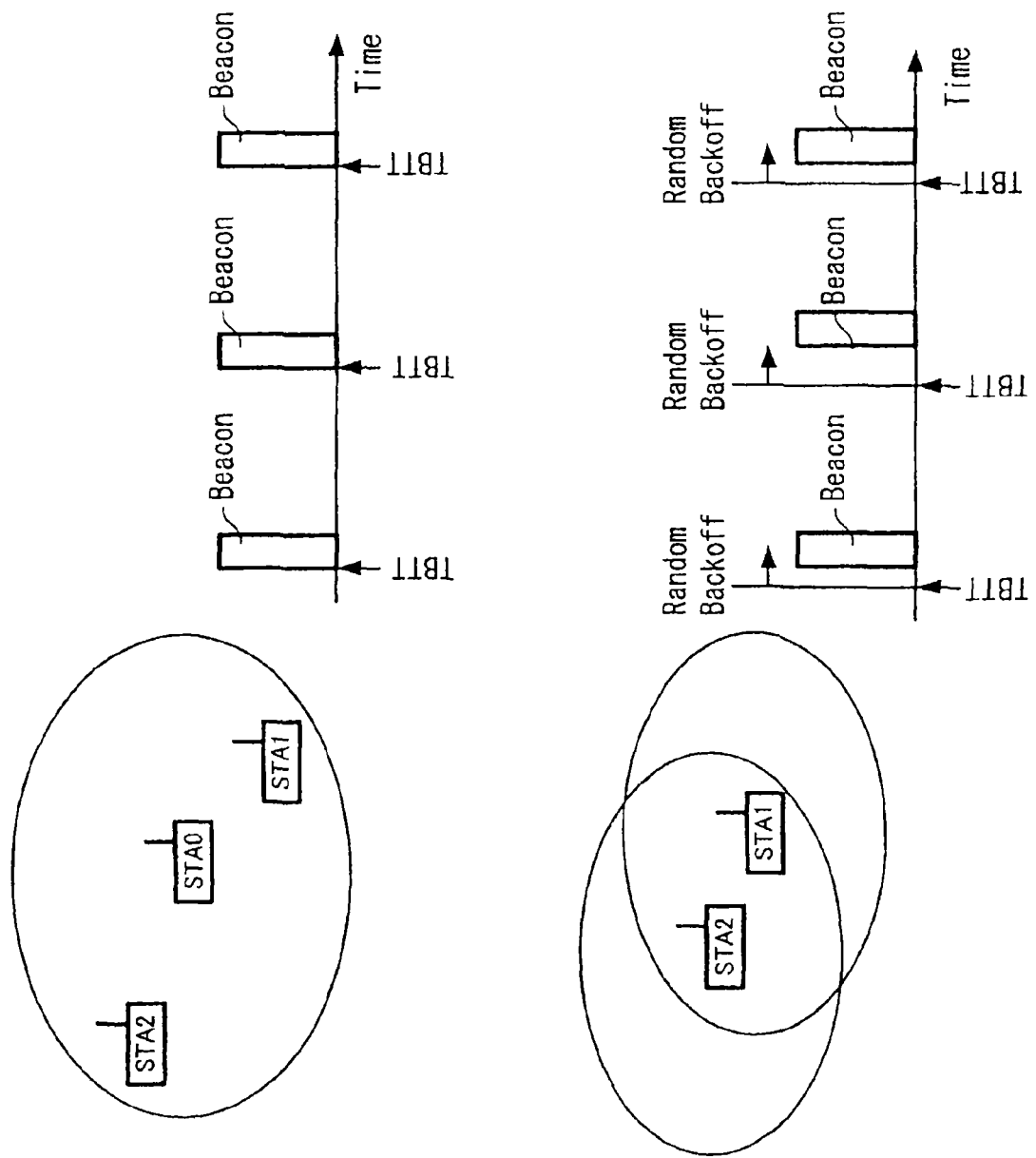
FIG. 30 is an explanatory diagram showing an example (infrastructure mode) of a conventional wireless communication system.
FIG. 31 is an explanatory diagram showing an example (ad hoc mode) of a conventional wireless communication system.
Figure 32:
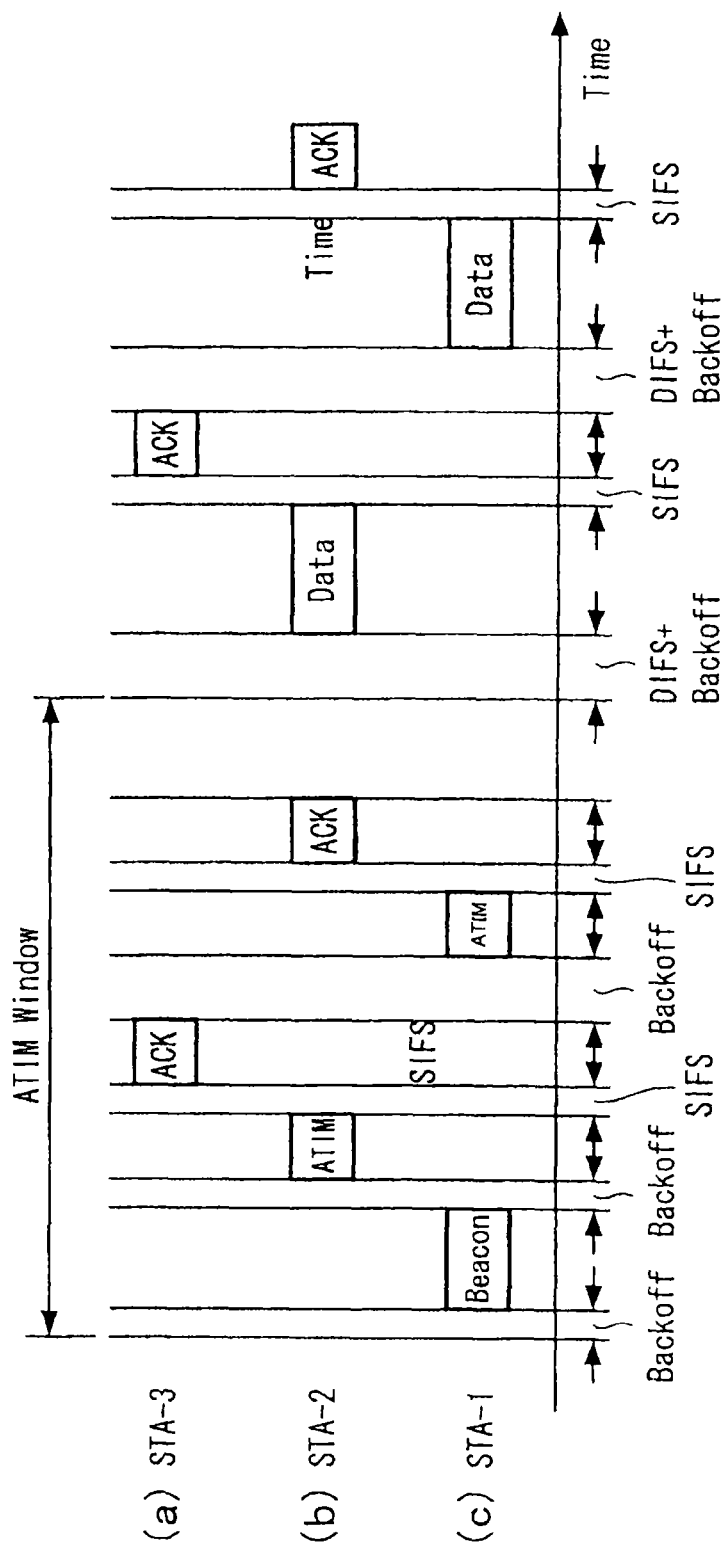
FIG. 32 is an explanatory diagram showing an example of a signal transmission procedure in the ad hoc mode according to the prior art.
Figure 33:
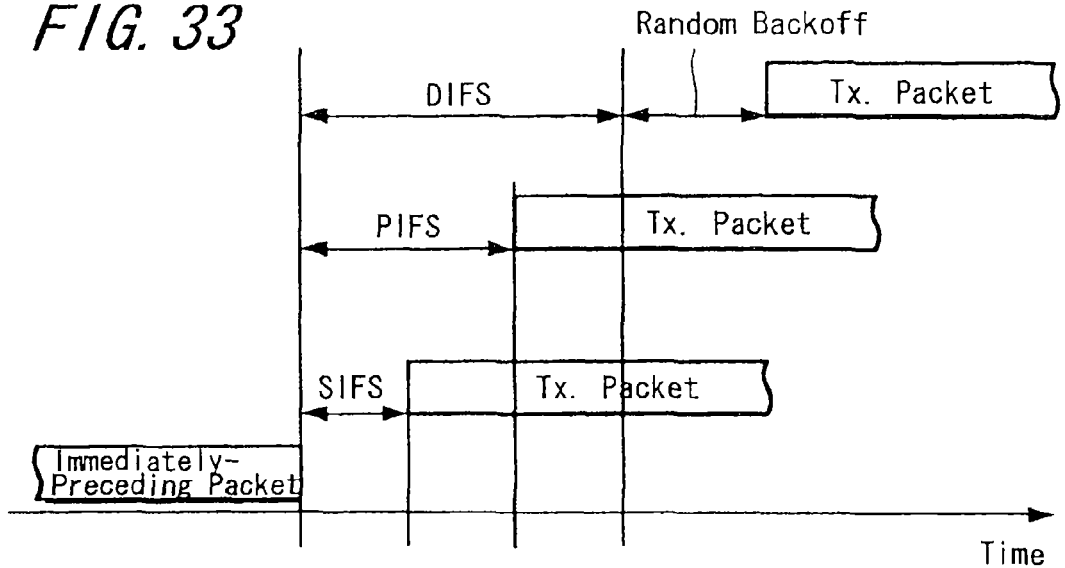
FIG. 33 is an explanatory diagram showing an example of a packet space in the conventional wireless communication system.
Figure 34:
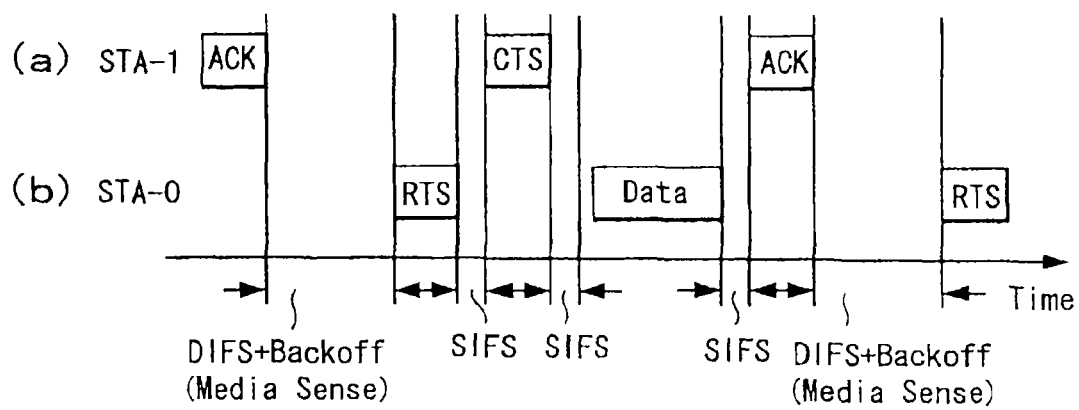
FIG. 34 is an explanatory diagram showing an example of a CSMA/CA procedure in the conventional wireless communication system.
Figure 35:
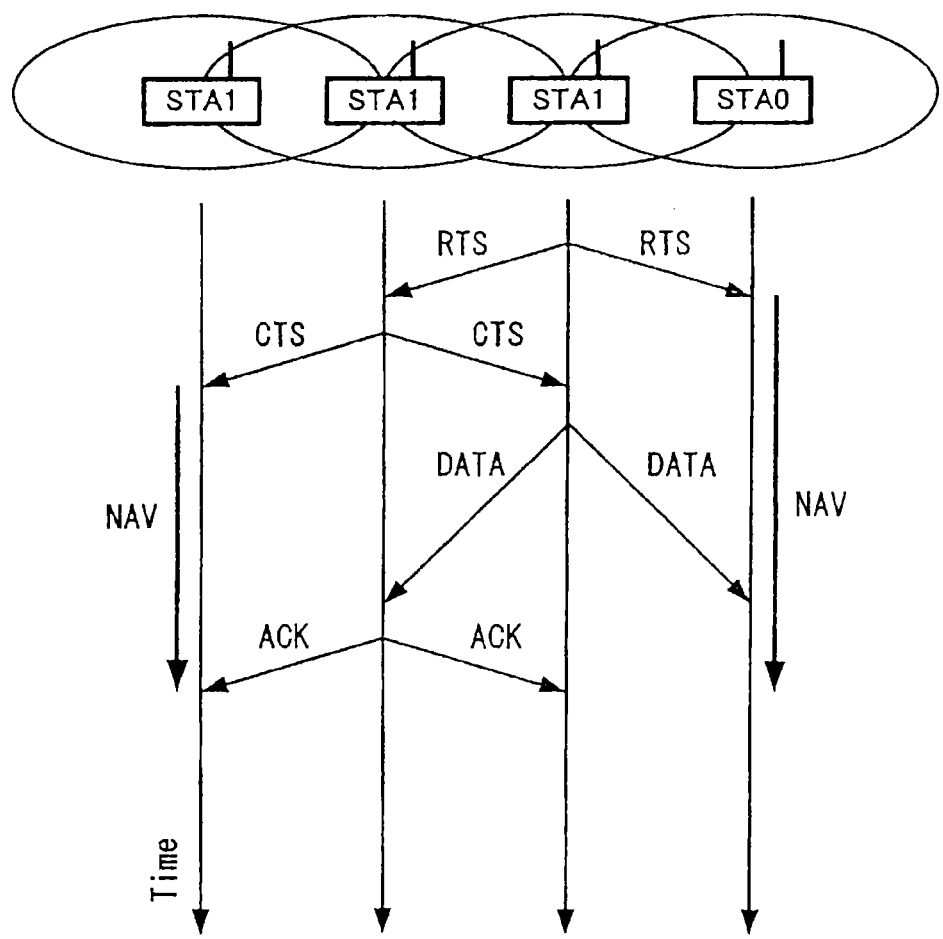
FIG. 35 is an explanatory diagram showing an example of CSMA/CA operation in the conventional wireless communication system.
Figure 36:
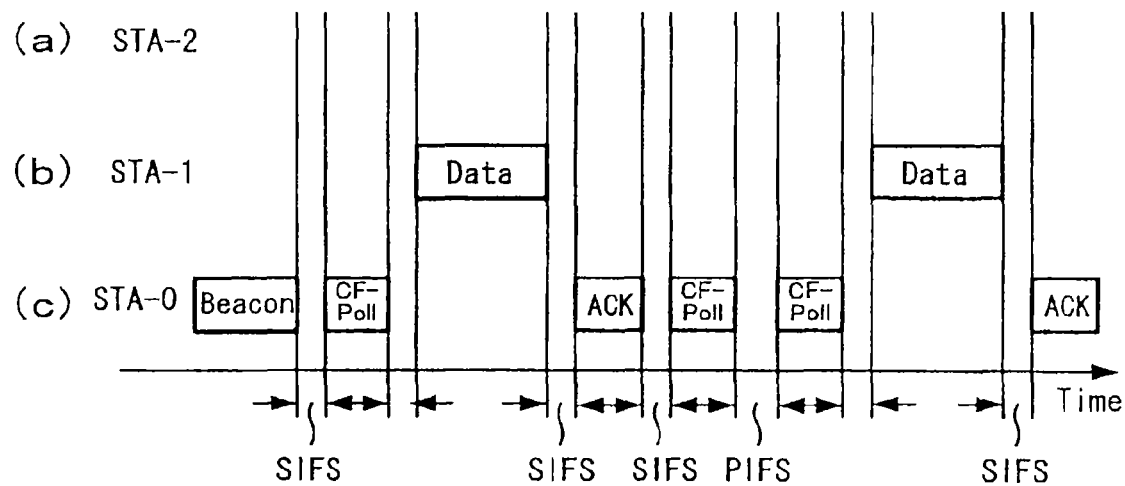
FIG. 36 is an explanatory diagram showing an example of band reserve transmission in the conventional wireless communication system.
Figure 37:
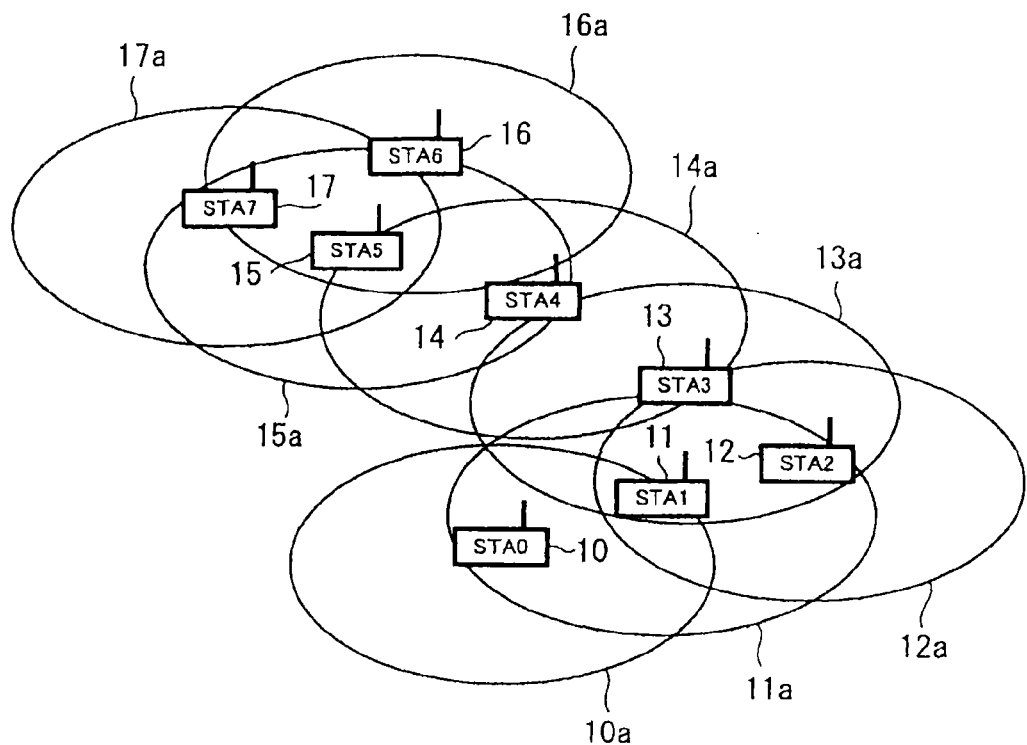
FIG. 37 is an explanatory diagram showing an example of the communication state in the conventional wireless communication system.
Figure 38:
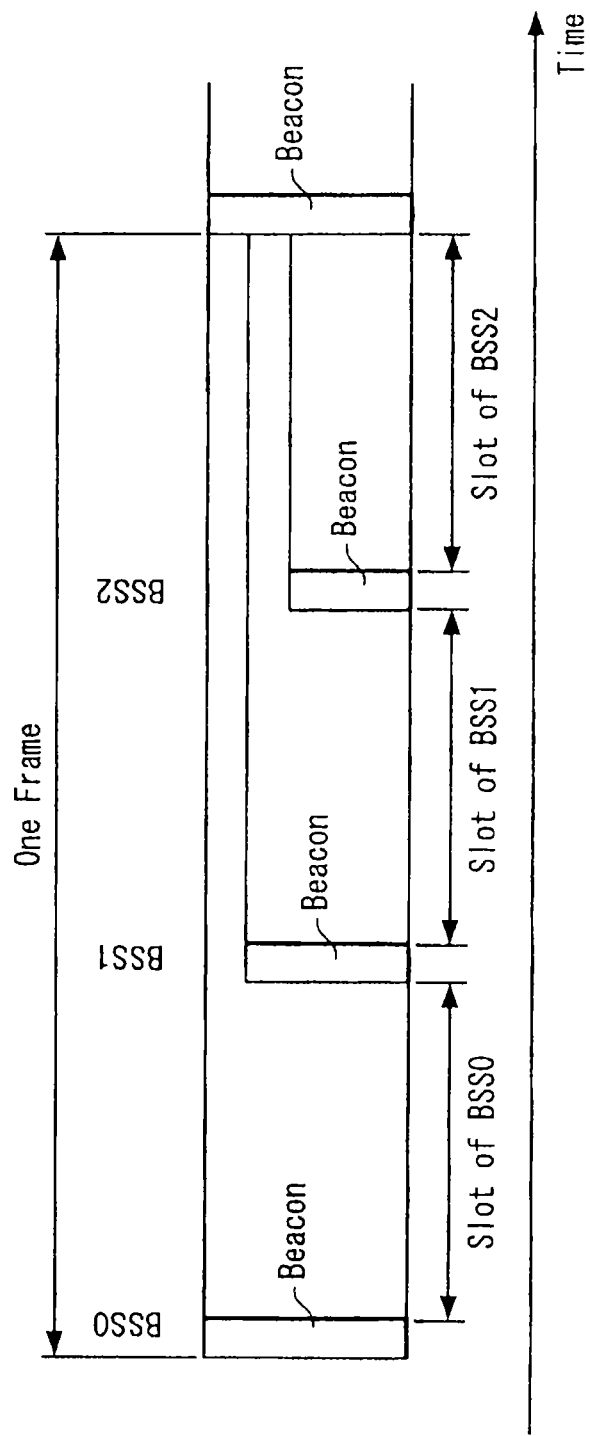
FIG. 38 is an explanatory diagram showing an example of an arrangement of a sub-slot in the conventional wireless communication system.

FIG. 29 shows a transmission sequence used to continuously transmit a large number of packets. FIG. 29 is a sequence diagram similar to FIG. 27, wherein FIG. 29A shows a transmission sequence of the communication station STA1, FIG. 29B shows a transmission sequence of the communication station STA0 and FIGS. 29C, 29D show the states of the transmission unit and the reception unit at the communication station STA0 (high level: active mode, low level: sleep mode).

At a time T0, the communication station STA1 starts transmitting the packet. After that, let it be assumed that the high-order layer informs the communication station STA0 that the communication station STA0 has information to be transmitted (Tx request). Since the communication station STA0 is placed in the sleep mode immediately before the time T1, it start confirming that the media is clear during a time period from the time T1 to the MDI. Then, in order to detect the unique word (preamble) of the packet transmitted from the communication station STA1 at the time T2, the communication station recognizes the existence of the packet transmitted from the communication station STA1. The communication station STA0 starts the random backoff procedure from the time T3 at which the transmission of this packet is ended. If the communication station does not detect the unique word until the time T4 at which the timer is de-energized, then the communication station transmits the packet at the time T4.

While the values of the time, the space and the transmission rate have been described as examples thereof, the present invention is not limited thereto, and it is needless to say that other values may be set to those values without departing from the gist of the present invention.

Also, while the exclusive communication apparatus for performing transmission and reception shown in FIG. 2 is constructed as the communication station in the above-mentioned embodiment, the present invention is not limited thereto and a board or a card for performing communication processing corresponding to the transmission unit and the reception unit in this embodiment may be attached to a personal computer apparatus for performing various data processing, for example, and software executed by the side of the computer apparatus may be installed on the baseband unit for processing.

The invention claimed is:
1. An electronic device comprising:
processing circuitry configured to
receive a first beacon from a first neighboring station and a second beacon from a second neighboring station;
determine a first offset value of the first beacon, the first offset value being calculated based on timing information received from the first neighboring station and first information held in the electronic device;
determine a second offset value of the second beacon, the second offset value being calculated based on timing information received from the second neighboring station and second information held in the electronic device;
determine a maximum offset value based on at least the first offset value and the second offset value; and adjust a beacon transmitting timing according to the maximum offset value.

2. The electronic device of claim 1, wherein the first beacon and the second beacon are received by the processing circuitry in a beacon space.

3. The electronic device of claim 2, wherein the beacon space is a beacon transmission period of the first neighboring station and the second neighboring station.

4. The electronic device of claim 3, wherein the processing circuitry is configured to receive a third beacon in the beacon transmission period.

5. The electronic device of claim 1, wherein the first offset value is calculated by comparing the timing information received from the first neighboring station and the first information, the first information is calculated by the processing circuitry.

6. The electronic device of claim 1, wherein
adjusting the beacon transmitting timing comprises comparing the maximum offset value and a predetermined value; and
the predetermined value is defined by an IEEE WLAN standard that includes at least one IEEE802.11 MAC and/or PHY standard.

7. The electronic device of claim 1, wherein the processing circuitry is configured to adjust the beacon transmit timing by referring to a clock timing, and the clock timing is adjusted according to the maximum offset value.

8. The electronic device of claim 1, wherein the processing circuitry is configured to receive or transmit a beacon according to OFDM (Orthogonal Frequency Division Multiplex).

9. The electronic device of claim 8, wherein the processing circuitry is configured to receive or transmit a beacon in an ad-hoc network with at least one other electronic device.

10. The electronic device of claim 1, wherein the maximum offset value is selected from the first offset value or the second offset value.

11. A method comprising:
receiving a first beacon from a first neighboring station and a second beacon from a second neighboring station;
determining a first offset value of the first beacon, the first offset value being calculated based on timing information received from the first neighboring station and first information held in an electronic device;
determining a second offset value of the second beacon, the second offset value being calculated based on timing information received from the second neighboring station and second information held in the electronic device;
determining, by processing circuitry, a maximum offset value based on at least the first offset value and the second offset value; and
adjusting, by the processing circuitry, a beacon transmitting timing according to the maximum offset value.

12. The method of claim 11, wherein the first beacon and the second beacon are received in a beacon space.

13. The method of claim 12, wherein the beacon space is a beacon transmission period of the first neighboring station and the second neighboring station.

14. The method of claim 13, wherein the receiving includes receiving a third beacon in the beacon transmission period.

15. The method of claim 11, wherein the first offset value is calculated by comparing the timing information received from the first neighboring station and the first information, the first information is calculated by the processing circuitry.

16. The method of claim 11, wherein
adjusting the beacon transmitting timing comprises comparing the maximum offset value and a predetermined value; and
the predetermined value is defined by an IEEE WLAN standard that includes at least one IEEE802.11 MAC and/or PHY standard.

17. The method of claim 11, wherein adjusting the beacon transmit timing comprises referring to a clock timing, and the clock timing is adjusted according to the maximum offset value.

18. The method of claim 11, further comprising receiving or transmitting a beacon according to OFDM (Orthogonal Frequency Division Multiplex).

19. The method of claim 18, wherein the receiving or transmitting includes receiving or transmitting the beacon in an ad-hoc network with at least one other communication apparatus.

20. The method of claim 11, wherein the maximum offset value is selected from the first offset value or the second offset value.

* * * * *